US009811941B1

(12) United States Patent
Hankins et al.

(10) Patent No.: US 9,811,941 B1
(45) Date of Patent: Nov. 7, 2017

(54) HIGH RESOLUTION SIMULATION OF LIQUIDS

(71) Applicant: Lucasfilm Entertainment Company Ltd., San Francisco, CA (US)

(72) Inventors: Frederick E. Hankins, Novato, CA (US); Nicholas Grant Rasmussen, Fairfax, CA (US); William Geiger, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 1191 days.

(21) Appl. No.: 13/874,284

(22) Filed: Apr. 30, 2013

Related U.S. Application Data

(60) Provisional application No. 61/849,828, filed on Mar. 13, 2013.

(51) Int. Cl.
*G06G 7/50* (2006.01)
*G06T 15/08* (2011.01)

(52) U.S. Cl.
CPC .................................. *G06T 15/08* (2013.01)

(58) Field of Classification Search
CPC ... G06F 17/5009; G06F 2217/16; G06G 7/57; G06T 15/08
USPC ............................................... 703/9; 382/100
See application file for complete search history.

(56) References Cited

U.S. PATENT DOCUMENTS

| 7,647,214 | B2* | 1/2010 | Song | G06F 17/5018 347/19 |
| 8,289,327 | B1* | 10/2012 | Horvath | G06T 13/60 345/428 |
| 2004/0012585 | A1* | 1/2004 | Takahashi | G06F 17/5018 345/419 |
| 2009/0207176 | A1* | 8/2009 | Gornowicz | G06T 13/60 345/474 |
| 2011/0112800 | A1* | 5/2011 | Kim | G06F 17/5018 703/1 |

OTHER PUBLICATIONS

Crane et al. "Real-Time Simulation and Rendering of 3D Fluids". ACM Transactions on Graphics, vol. 29, No. 6, Article 174, Publication date: Dec. 2010. 8 Pages.*

(Continued)

*Primary Examiner* — Eunhee Kim
(74) *Attorney, Agent, or Firm* — Kilpatrick Townsend & Stockton LLP

(57) ABSTRACT

Methods, systems and computer program products pertaining to simulating liquid bodies are presented. The subject matter of this document can be embodied in a method that includes obtaining one or more data arrays representing low frequency spatial features of a simulated volume of liquid, and up-sampling the one or more data arrays to produce corresponding high resolution data arrays. The method also includes obtaining procedural data representing high frequency spatial features of a simulated liquid surface, and modifying the one or more high resolution data arrays using the procedural data to produce corresponding modified data arrays that reflect both the high frequency and the low frequency spatial features of the simulated volume of liquid.

39 Claims, 17 Drawing Sheets

(56) References Cited

OTHER PUBLICATIONS

Pfaff et al. "Scalable Fluid Simulation using Anisotropic Turbulence Particles". From the new book GPU Gems 3, edited by Hubert Nguyen, published by Addison-Wesley Professional, Aug. 2007, ISBN 0321515269. Copyright 2008 NVIDIA Corporation. p. 633-675.*
Constructive solid geometry: http://en.wikipedia.org/wiki/Constructive_solid_geometry, last modified Feb. 25, 2013.
Enright et al. "*Animation and Rendering of Complex Water Surfaces*", SIGGRAPH 2002, ACM TOG 21, 736-744 (2002); 9 pages.
Museth, K. et al. "*Blobtacular: Surfacing particle systems in Pirates of the Caribbean 3*", Digital Domain, Inc.; 1 page, SIGGRAPH '07 (2007).
Neyret, F. "*Advected Textures*", Eurographics/SIGGRAPH Symposium on Computer Animation (2003); 7 pages.
Nielson, G. "*Dual Marching Cubes*", Arizona State University; IEEE Visualization 2004, Oct. 10-15, Austin, Texas; 8 pages.
Premože, et al. "*Particle-Based Simulation of Fluids*", The Eurographics Association and Blackwell Publishers 2003, vol. 22 (2003), No. 3; 10 pages.
Tessendorf, J. "*Simulating Ocean Water*", Copyright 1999-2001; 19 pages.
Zhu et al. "*Animating Sand as a Fluid*", ACM Transactions on Graphics—TOG, vol. 24, No. 3, pp. 965-972, 2005.
Zhu, Y. "*Animating Sand as a Fluid*", B.Sc., Peking University, 2003; Thesis submitted in partial fulfillment of the requirements for degree of Master of Science; The University of British Columbia; Nov. 2005; 51 pages.

* cited by examiner

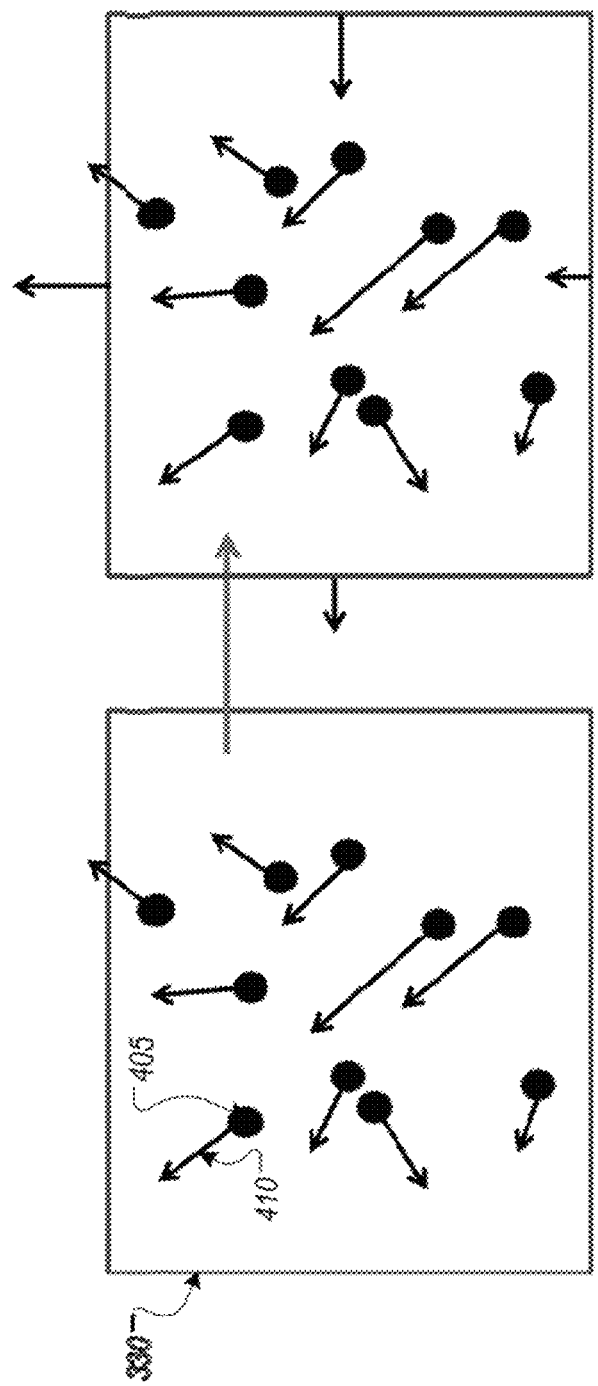

HIGH RESOLUTION SIMULATION OF LIQUIDS

CROSS-REFERENCE TO RELATED APPLICATION

This application claims priority under 35 USC §119(e) to U.S. Patent Application Ser. No. 61/849,828, filed on Mar. 13, 2013, the entire contents of which are hereby incorporated by reference.

TECHNICAL FIELD

This document relates to high resolution simulation of liquids such as water.

BACKGROUND

Computer graphics applications in motion pictures often require simulation of water bodies such as an ocean or river. Simulation data representing such water bodies include insufficient details for generating effects such as sprays or foam.

SUMMARY

The systems and techniques described here relate to high resolution simulations of water bodies.

In one aspect, a method includes obtaining one or more data arrays representing low frequency spatial features of a simulated volume of liquid, and up-sampling the one or more data arrays to produce corresponding high resolution data arrays. The method also includes obtaining procedural data representing high frequency spatial features of a simulated liquid surface, and modifying the one or more high resolution data arrays using the procedural data to produce corresponding modified data arrays that reflect both the high frequency and the low frequency spatial features of the simulated volume of liquid.

In another aspect, a system includes a computing device. The computing device includes a memory configured to store instructions, and a processor configured to execute the instructions to perform a method. The method includes obtaining one or more data arrays representing low frequency spatial features of a simulated volume of liquid, and up-sampling the one or more data arrays to produce corresponding high resolution data arrays. The method also includes obtaining procedural data representing high frequency spatial features of a simulated liquid surface, and modifying the one or more high resolution data arrays using the procedural data to produce corresponding modified data arrays that reflect both the high frequency and the low frequency spatial features of the simulated volume of liquid.

In another aspect, the disclosure features a computer program product tangibly embodied in a computer readable storage device. The computer program product includes instructions that when executed by a processor perform a method. The method includes obtaining one or more data arrays representing low frequency spatial features of a simulated volume of liquid, and up-sampling the one or more data arrays to produce corresponding high resolution data arrays. The method also includes obtaining procedural data representing high frequency spatial features of a simulated liquid surface, and modifying the one or more high resolution data arrays using the procedural data to produce corresponding modified data arrays that reflect both the high frequency and the low frequency spatial features of the simulated volume of liquid.

Implementations of the above aspects can include one or more of the following. At least one image frame can be rendered using the one or more modified data arrays. A simulation can be performed using the one or more modified data arrays. The simulation can include particle simulation. A preview image can be produced based on the one or more modified data arrays. The preview image can be produced before producing a corresponding rendered image. Modifying the one or more high resolution arrays can include mapping a first data point of procedural data to a second data point of the one or more high resolution arrays, and modifying the second data point based on the first data point. Mapping the first data point to the second data point can be based on texture coordinate data related to the simulated volume of liquid. The one or more data arrays representing the low frequency spatial features can include a data array representing an implicit surface of the simulated volume of liquid. The one or more data arrays representing the low frequency spatial features can include a data array representing velocities at a plurality of points within the simulated volume of liquid. The procedural data can be synthesized based on a user input. The one or more data arrays can be three dimensional. The procedural data can include a set of vectors that represents simulated waves on the simulated liquid surface. Each vector in the set of vectors can include an in-plane displacement component and a height-field component.

In another aspect, a method includes partitioning a set of simulated particles into multiple groups, the set representing a spatial distribution of a simulated liquid, and computing dynamics of a first group of particles and dynamics of a second group of particles independently from one another. Each of the first and second groups are included in the multiple groups. The method also includes combining the computed dynamics of the first and second group of particles to determine dynamics of at least a portion of the set of simulated particles.

In another aspect, a system includes a computing device. The computing device includes a memory configured to store instructions, and a processor configured to execute the instructions to perform a method. The method includes partitioning a set of simulated particles into multiple groups, the set representing a spatial distribution of a simulated liquid, and computing dynamics of a first group of particles and dynamics of a second group of particles independently from one another. Each of the first and second groups are included in the multiple groups. The method also includes combining the computed dynamics of the first and second group of particles to determine dynamics of at least a portion of the set of simulated particles.

In another aspect, the disclosure features a computer program product tangibly embodied in a computer readable storage device. The computer program product includes instructions that when executed by a processor perform a method. The method includes partitioning a set of simulated particles into multiple groups, the set representing a spatial distribution of a simulated liquid, and computing dynamics of a first group of particles and dynamics of a second group of particles independently from one another. Each of the first and second groups are included in the multiple groups. The method also includes combining the computed dynamics of the first and second group of particles to determine dynamics of at least a portion of the set of simulated particles.

Implementations of the above aspects can include one or more of the following. A spatial range of influence can be defined for a particular simulated particle, and the particular simulated particle can be in the first group based on an extent of the spatial range of influence of the particular simulated particle. The particular simulated particle can also be included in the second group. The particular simulated particle can be included in a third group that is different from the first group and the second group. The dynamics of the first and second group of simulated particles can be computed in parallel. At least a portion of a spatial extent of the first group can overlap with a spatial extent of the second group. A grid can be overlaid on the spatial distribution of the simulated liquid. The set of simulated particles can be partitioned into the multiple groups based on their locations with respect to the overlaid grid. A unit can be defined based on the overlaid grid for partitioning the set of simulated particles into multiple groups. At least the portion of the simulated particles can be rendered based on the dynamics determined for the portion.

In another aspect, a method includes partitioning a set of simulated particles into multiple groups, the set representing a spatial distribution of a simulated liquid, and computing a first surface based on a first group of particles and computing a second surface based on a second group of particles. The first and second surfaces can be computed independently from one another, and each of the first and second groups can be included in the multiple groups. The method also includes combining the first and second surfaces to compute a combined surface representing at least a portion of the set of simulated particles.

In another aspect, a system includes a computing device. The computing device includes a memory configured to store instructions, and a processor configured to execute the instructions to perform a method. The method includes partitioning a set of simulated particles into multiple groups, the set representing a spatial distribution of a simulated liquid, and computing a first surface based on a first group of particles and computing a second surface based on a second group of particles. The first and second surfaces can be computed independently from one another, and each of the first and second groups can be included in the multiple groups. The method also includes combining the first and second surfaces to compute a combined surface representing at least a portion of the set of simulated particles.

In another aspect, the disclosure features a computer program product tangibly embodied in a computer readable storage device. The computer program product includes instructions that when executed by a processor perform a method. The method includes partitioning a set of simulated particles into multiple groups, the set representing a spatial distribution of a simulated liquid, and computing a first surface based on a first group of particles and computing a second surface based on a second group of particles. The first and second surfaces can be computed independently from one another, and each of the first and second groups can be included in the multiple groups. The method also includes combining the first and second surfaces to compute a combined surface representing at least a portion of the set of simulated particles.

Implementations of the above aspects can include one or more of the following. A spatial range of influence can be defined for a particular simulated particle, and the particular simulated particle can be included in the first group based on an extent of the spatial range of influence of the particular simulated particle. The particular simulated particle can also be included in the second group. The particular simulated particle can be included in a third group that is different from the first and second groups. The first and second surfaces can be computed in parallel. At least a portion of a spatial extent of the first group can overlap with a spatial extent of the second group. An overlapping portion of the first and second surfaces can be determined, and one or more points computed for one of the first and second surfaces can be discarded in computing the combined surface. A grid can be overlaid on the spatial distribution of the simulated liquid. The set of simulated particles can be partitioned into the multiple groups based on their locations with respect the overlaid grid. A unit can be defined based on the overlaid grid for the partitioning the set of simulated particles into the multiple groups. The combined surface can be rendered. Two particles can be included in computing the first surface upon determining that a spatial separation between the two particles is less than a threshold distance.

In another aspect, a method includes receiving simulation data representing a breach of a simulated liquid surface by a virtual object, and determining an initial set of simulated particles that escape the simulated liquid surface due to the breach. The method also includes determining a final set of particles from the initial set, such that for a particle included in the final set, a threshold condition is satisfied. The threshold condition can be related to dynamics of the particle upon escaping the liquid surface.

In another aspect, a system includes a computing device. The computing device includes a memory configured to store instructions, and a processor configured to execute the instructions to perform a method. The method includes receiving simulation data representing a breach of a simulated liquid surface by a virtual object, and determining an initial set of simulated particles that escape the simulated liquid surface due to the breach. The method also includes determining a final set of particles from the initial set, such that for a particle included in the final set, a threshold condition is satisfied. The threshold condition can be related to dynamics of the particle upon escaping the liquid surface.

In another aspect, the disclosure features a computer program product tangibly embodied in a computer readable storage device. The computer program product includes instructions that when executed by a processor perform a method. The method includes receiving simulation data representing a breach of a simulated liquid surface by a virtual object, and determining an initial set of simulated particles that escape the simulated liquid surface due to the breach. The method also includes determining a final set of particles from the initial set, such that for a particle included in the final set, a threshold condition is satisfied. The threshold condition can be related to dynamics of the particle upon escaping the liquid surface.

Implementations of the above aspects can include one or more of the following. A second simulation can be performed based on the final set of particles. The threshold condition can include a threshold distance relative to the liquid surface. The threshold condition can reflect a time duration spent by the particle above the liquid surface. The dynamics of the particle can be tracked to determine a time when the particle escapes the liquid surface, and a time period spent by the particle above the liquid surface can be determined by computing a difference between a current time and the time when the particle escaped the liquid surface. An operation can be performed to determine whether the time period exceeds the time duration reflected by the threshold condition.

In various implementations, the systems and techniques described in this document can provide one or more of the following advantages. High frequency spatial features related to a volume of liquid can be numerically generated by up-sampling simulation data and modifying the up-sampled data using procedurally generated high frequency details. The high frequency spatial features can be previewed before rendering. Modified high resolution data arrays produced in the process can be used for secondary simulations such as particle simulations used in generating effects such as spray or foam on a liquid surface. By partitioning computationally intensive particle simulations into smaller and independent computational domains, computations and memory requirements for such simulations can be reduced. Computations in two or more such independent computational domains can be performed in parallel, thereby reducing the amount of computation time. By allowing for selection of particles based on a threshold, particle simulations can be made more realistic and computationally efficient.

Details of one or more implementations are set forth in the accompanying drawings and the description below. Other features, aspects and advantages will be apparent from the description and drawings, and from the claims.

DESCRIPTION OF DRAWINGS

FIGS. 4A-4F illustrate an example of computing dynamics of particles.

DETAILED DESCRIPTION

High Resolution Liquid Simulation

Figure 1A:
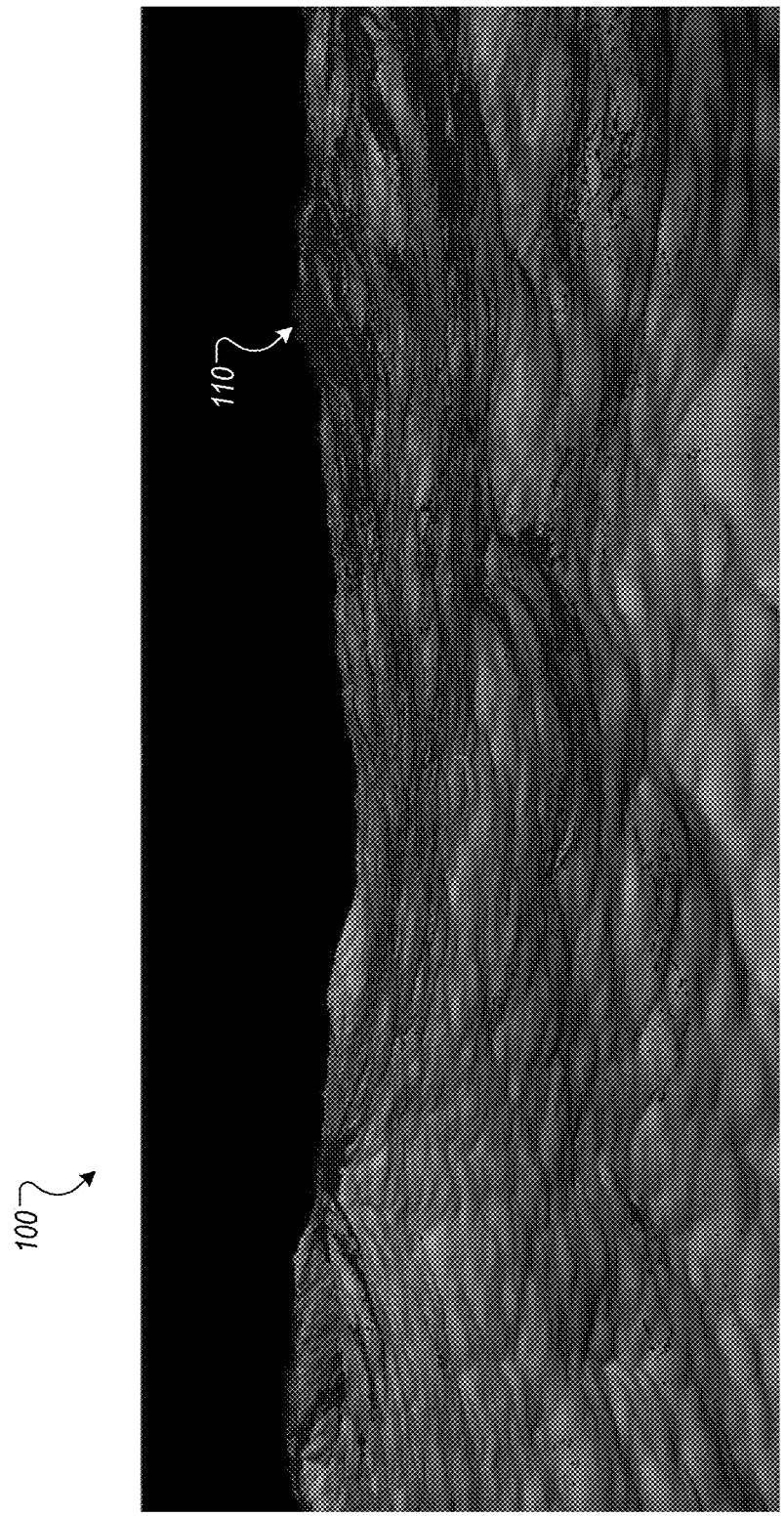
FIGS. 1A-1C show various levels of details on a simulated volume of liquid.
Figure 1B:
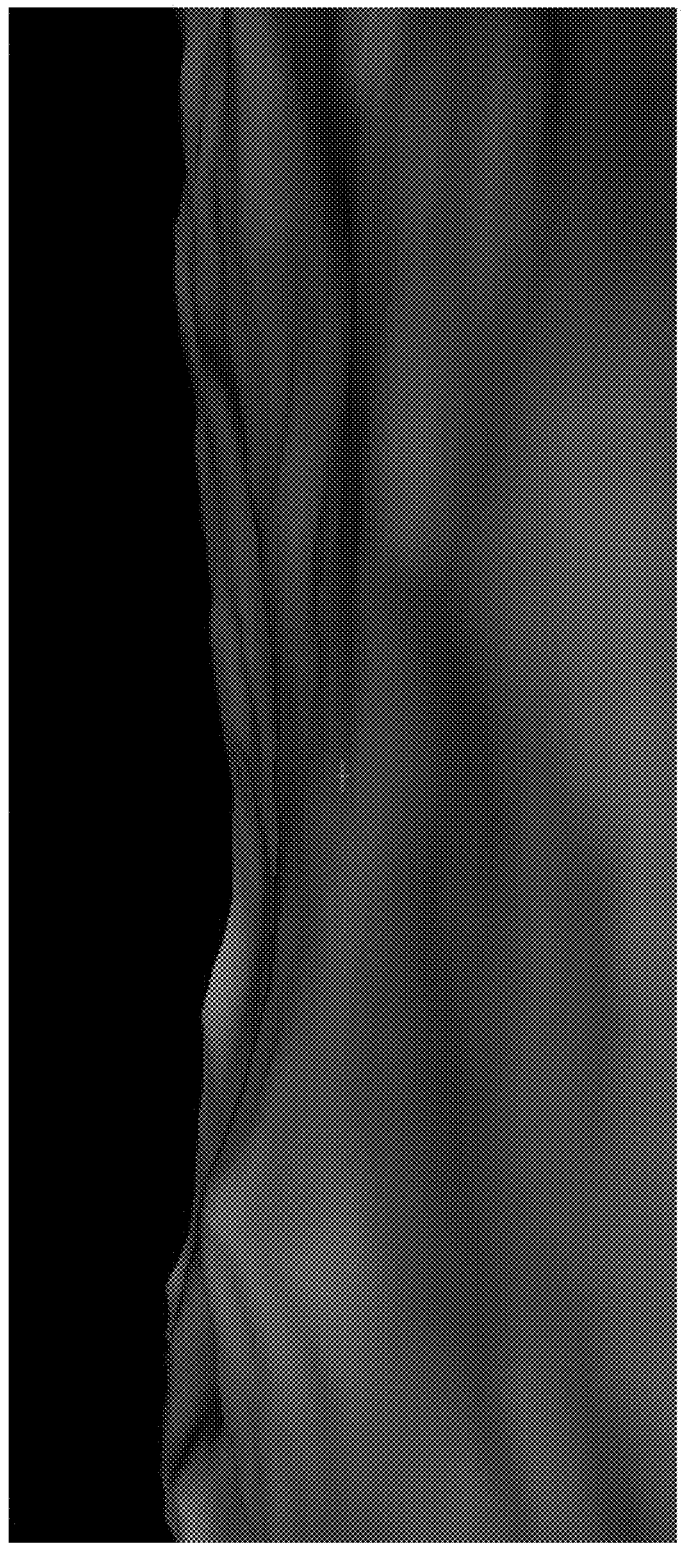

Computer graphics applications, for example, as utilized in motion pictures and video games, often require simulation of a volume of liquid, such as an ocean, a river, a lake, a pool, a puddle, etc. FIG. 1A shows a simulated view 100 of an ocean as an example of such a simulated volume of liquid. Even though this document generally describes water as an example of a liquid, other examples include, without limitation, oil, alcohol, milk, or other fluids with different characteristics such as different degrees of viscosity. In some implementations, the simulated volume of liquid can include a combination of liquids, for example, an oil spill on an ocean surface. In general, the simulated volumes of liquid can include both high frequency and low frequency spatial features. The low frequency spatial features can include, for example, slowly varying peaks and crests, associated, for example, with ocean currents, waves, etc. An example of such low frequency spatial features are shown in FIG. 1B.

Figure 1C:
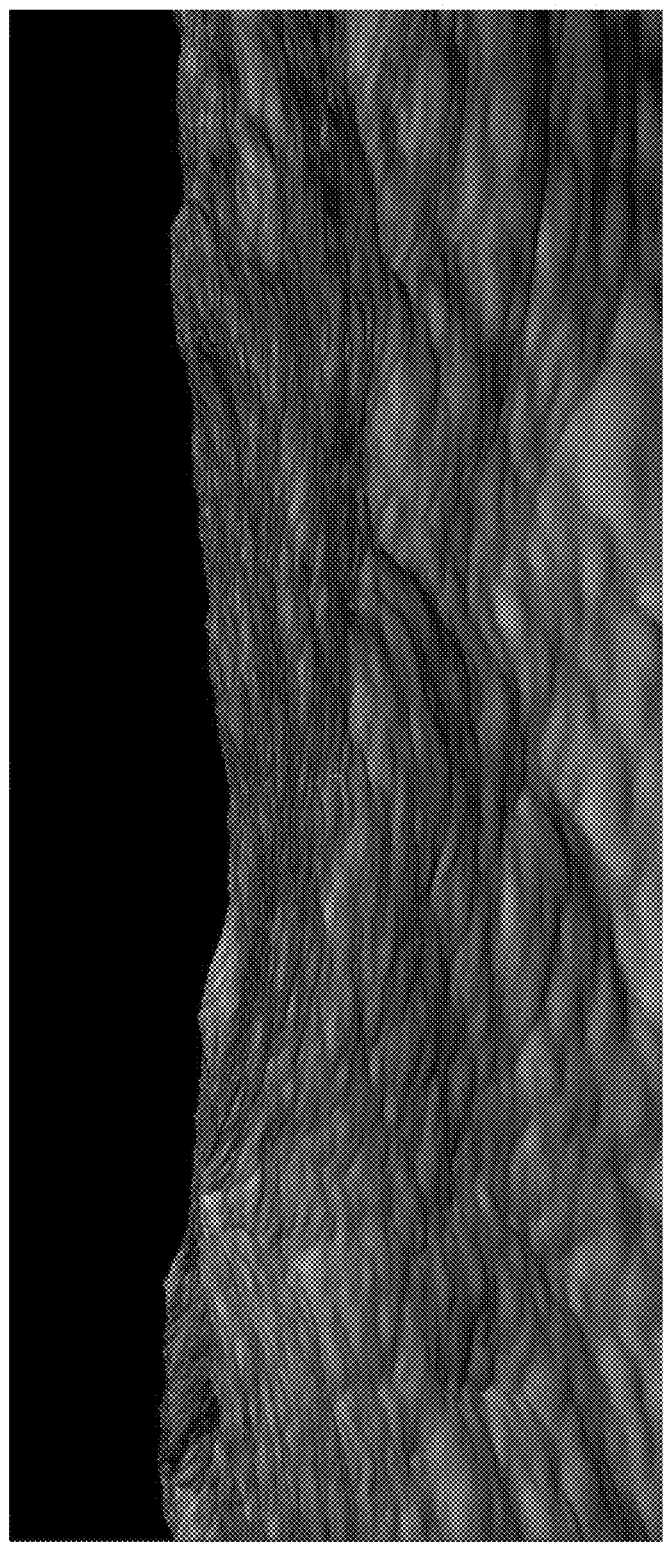

The high frequency spatial features can include, for example, ripples (e.g. as depicted in FIG. 1C) or other patterns. The low frequency spatial features can be obtained, for example, via a simulation of the volume of liquid. The high frequency spatial features such as ripples on a surface can be obtained procedurally, for example, using numerical computations. Features such as foam or spray (e.g. the foam 110 depicted in FIG. 1A) can be obtained, for example, via secondary simulations such as particle simulations. A combination of the low and high frequency features results in a realistic representation of the simulated volume of liquid.

In computer graphics applications, combining the high frequency spatial features with the low frequency spatial features can be a challenge. One approach relies on rendering the low frequency simulation data such that a shader associated with the water surface produces the high-frequency details. However, this process requires a separate rendering process that leads to a cumbersome workflow. Being dependent on rendering (which is a computationally intensive process), this approach can be time consuming. In addition, the procedurally generated high frequency details cannot be previewed prior to the rendering of an entire scene. In contrast, the methods and systems described in this document allow for analytically combining the procedurally generated data with the low frequency data related to the simulated volume of liquid. The high frequency and low frequency features can therefore be combined without being dependent on a rendering process. In addition, by producing analytical simulation data that reflects both the high frequency and low frequency spatial features, the described methods and systems allow for generation of a preview image prior to the rendering. An artist working with the simulated volume of liquid can therefore adjust parameters of the low frequency simulation and/or the procedurally generated high frequency data to his/her satisfaction before the simulated volume of liquid is provided to a rendering engine. Also, the analytical simulation data that reflects both the high frequency and low frequency spatial features can be directly used in additional simulation processes, such as particle simulations to produce additional details like foam or spray on an ocean surface.

Figure 2:
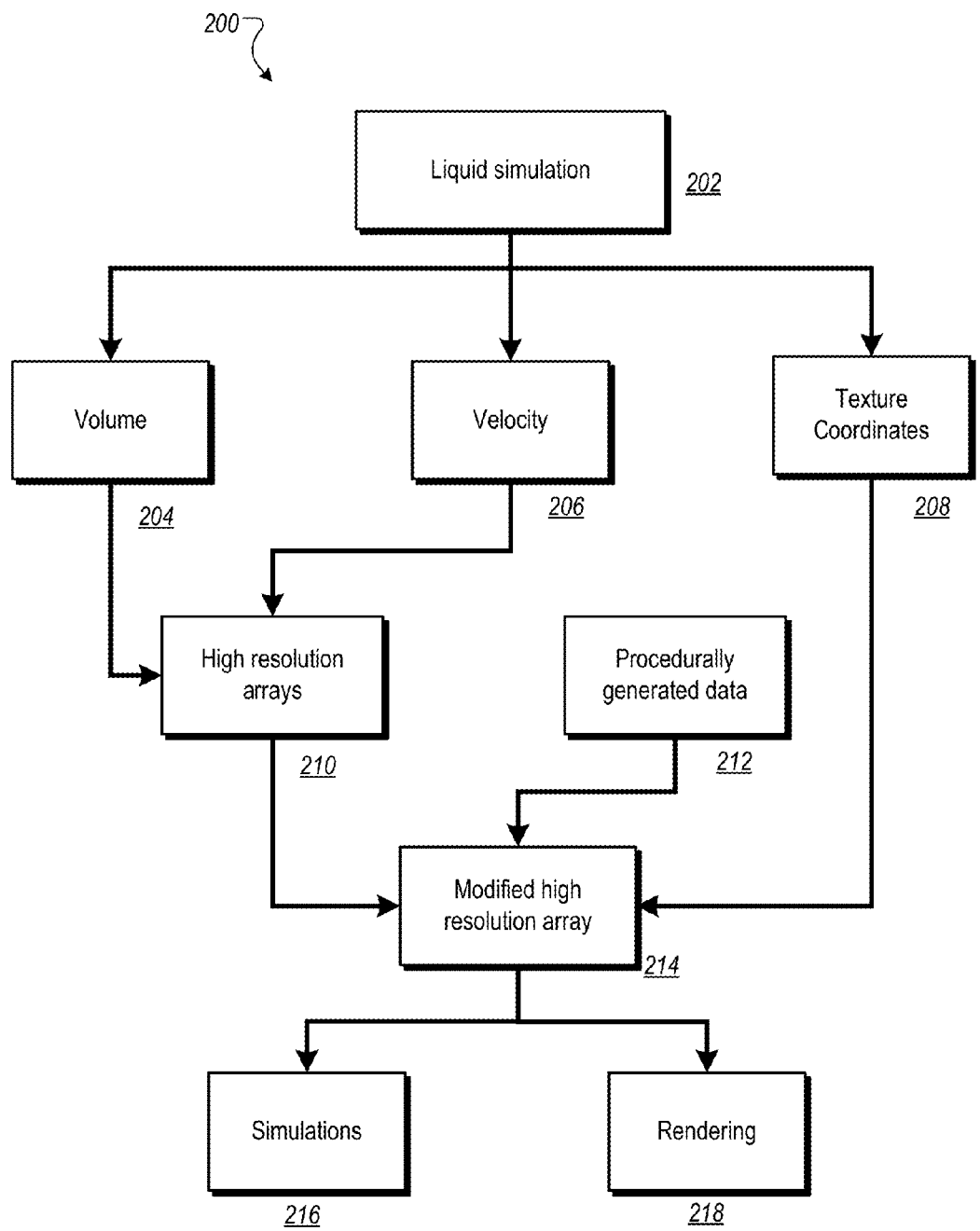
FIG. 2 depicts a flow diagram associated with generating high resolution simulation data.

FIG. 2. depicts a flow diagram 200 associated with generating high resolution simulation data that reflects both the high frequency and low frequency features of a simulated volume of liquid. In some implementations the low frequency simulation data can be obtained, for example, using a liquid simulation process 202. The resolution selected for the liquid simulation 202 affects the amount of computation required for the solution. Because liquid simulation is typically a computation-intensive process, the resolution can be chosen to produce representations of low frequency spatial features such as slowly varying waves and crests (e.g., as depicted in FIG. 1B). In some implementations, the liquid simulation 202 is based on the physics of fluid motion and is computed from a set of input parameters that represent, for example, configuration of the liquid, and scene geometry. Various computational fluid dynamics techniques and algorithms can be used for the liquid simulation 202. These techniques can utilize, for example, Navier-Stokes equations, Eulerian grid based methods, vorticity based methods, smoothed particle hydrodynamics methods and Lattice Boltzmann methods.

In some implementations, the liquid simulation 202 can include a Fluid-Implicit-Particle (FLIP) based method, a particle levelset method or a combination of any of the above mentioned methods. The particle levelset method is an Eulerian grid-based method that uses particles for surface tracking. FLIP based methods use particles as a primary representation of a liquid and uses auxiliary grids for performing fluid dynamics calculations. Both the particle levelset method and the FLIP based method can be considered to be hybrid techniques because they make use of both grids and particles.

The liquid simulation 202 can produce one or more data arrays that collectively form a digital representation of the simulated volume of liquid. For example, the liquid simulation 202 can produce a three-dimensional scalar data array 204 that represents a volume of the simulated liquid. The liquid simulation 202 can also produce, for example, a three dimensional vector data array 206 that represents velocities associated with unit volumes of the liquid digitally represented in the volume array 204. The surface of the simulated volume of liquid, represented by the volume array 204 and the velocity array 206, can be referred to as an implicit surface and typically includes low frequency spatial features associated with the simulated volume of liquid. An example of the implicit surface is depicted in FIG. 1B.

In some implementations, the liquid simulation 202 also produces a set of vector-valued texture coordinates 208 that can be used to add additional detail, such as surface texture or color, to the simulated volume of liquid represented by the data arrays 204 and 206. The texture coordinates 208 can also be represented, for example, as a three dimensional array that provides a mapping between the simulated volume of liquid and additional details that are to be added at each point of the simulated volume. In some implementations, the texture coordinates 208 allow for a texture map to be applied to the implicit surface of the simulated volume of liquid. For example, a data point in the data arrays 204 or 206 can be mapped to a texture coordinate (which can be vector valued), for example, by assignment or by a procedural definition. In some implementations, this can produce a visual result that appears to have more richness than afforded by using only the data arrays 204 and 206. In some implementations, the texture coordinates 208 can include multiple texture arrays, each of which describe a different type of texture. For example, the texture coordinates 208 can include a data array representing a lookup into a displacement map texture in addition to another data array that represents surface or volume details.

In some implementations, for example, when applied to the implicit surface, the applied texture is expected to move in accordance with the movement of the liquid volume. Therefore, data from the texture coordinates 208 can be passively advected with the velocity data array 206. The liquid simulation 202 can passively advect a set of three texture coordinate arrays with the velocity data array 206. Each of the texture coordinate arrays 208 can be three-dimensional. A data point of the texture coordinate array 208 can exist at the center of each cell and a value of the data point can be initialized to the integer coordinates of that cell cast to floating point values. At initialization time, a unique per-array random vector offset can be added to each element of the texture coordinate arrays. In addition, a weight can be associated with each texture coordinate array 208. The weights can be normalized such that they sum to 1. For a given point in the upsampled or high resolution version of the volume data array 206, the texture coordinate arrays 208 can be used to map additional data to that point.

The texture data can represent, for example, color or material properties, turbulence property to be added to the velocity points, or displacement to modify a base contour of an implicit surface. The texture coordinates 208 can provide a mapping from the fluid volume to the texture space. Various texture data for a given point can be looked up and then the results from the various lookups can be combined (for example, after being modulated by corresponding weights) to produce the final result.

In some implementations, as the texture coordinates 208 are advected with the simulation, they become distorted. To address this, a time period over which a single texture coordinate array 208 is valid can be chosen at the beginning of the simulation. In such cases, a particular texture coordinate array 208 can be valid within a specified time period. An associated weight can be computed directly from the time using a periodic function whose period equals that of the texture coordinate simulation. As the simulation advances, the texture times can be updated and the texture coordinate arrays can be reset when they become invalid. In general, texture coordinates provide a mapping between the space a fluid simulation is defined in and texture data that contains information (e.g. displacement) that is added to the fluid simulation. The texture coordinates are advected with the fluid simulation to allow the texture detail to appear as if it is being influenced by the fluid. Various texture coordinate arrays can be used without deviating from the scope of this disclosure. In some implementations, the texture coordinates 208 provide a look-up functionality that allows mapping of procedurally generated data on to the simulated volume of liquid.

In some implementations, the simulation data produced by the liquid simulation 202 is analytically combined with the procedurally generated data 212. Procedural generation refers to content that is generated via numerical computations rather than from a pre-determined set of files and conditions. For example, in a video game, a user may choose to operate a helicopter over a simulated portion of an ocean, and the wind conditions created over the surface would have to be procedurally calculated based on the user-defined path of the helicopter. Therefore, the ripples on the water surface caused by the generated wind conditions would have to be computed from the procedurally generated data 212.

In applications such as motion picture production, the procedurally generated data 212 can be based on a noise-field for generating additional details to the implicit surface. Such noise-fields can be generated as a patterned sequence of pseudorandom numbers. An example of such procedurally generated noise is Perlin noise, which is a gradient noise often used to make computer generated images appear more realistic. In some implementations, the procedurally generated data can include vector components such as in-plane displacements and height-fields. For example, statistical wave models that represent wave height fields using fast Fourier transform (FFT) based representations, can be used as the procedurally generated data.

The procedurally generated data 212 is typically high resolution. Therefore, for the simulated liquid volume to interact with the procedurally generated data, it could be useful for the liquid simulation data to be high resolution. In some implementations, the data arrays produced by the liquid simulation 202 are up-sampled to create high resolution arrays 210 that can be combined with the procedurally generated data 212. Alternatively, the liquid simulation 202 can be configured to produce the high resolution arrays 210 directly. In some implementations, the volume data array 204 and the velocity data array 206 are up-sampled at least along one dimension to produce the high resolution arrays 210. For example, if the volume data arrays 204 and the velocity data arrays 206 are of dimensions 100×100×100, the corresponding high resolution arrays 210 can have dimensions 200×200×200 or more. In general, the dimensions of the high resolution arrays can be determined based on the level of resolution desired for a particular application. The high resolution arrays 210 can be obtained from the volume data array 204 or the velocity data array 206 via up-sampling based on interpolation techniques such as linear interpolation, polynomial interpolation, and spline interpolation.

The high resolution arrays 210 can be modified using the procedurally generated data 212 to produce modified high resolution arrays that reflect both the low frequency and high frequency spatial features of the simulated volume of liquid. This can include, for example, modifying a first data point of a high resolution array 210 based on a second data point from the procedurally generated data. In some implementations, the second data point can be analytically combined with the first data point (e.g. by performing a mathematical operation such as add or subtract). The original first data point can then be replaced by the result of the analytical operation to produce a data point in a modified high resolution array. In some implementations, modifying a data point of a high resolution array 210 can be based on a plurality of data points from the high resolution array 210 and the procedurally generated data 212.

In some implementations, only a subset of the data arrays produced by the liquid simulation 202 can be modified by the procedurally generated data. For example, if the procedurally generated data includes in-plane displacement and height-field components, the resultant vectors (e.g. vector sum of the two components) can be used to modify only the high resolution version of the velocity data array 206. In some implementations, only a particular component of the procedurally generated data is used to modify one or more of the high resolution arrays 210. For example, only a height-field component from the procedurally generated data can be used to modify a high resolution array 210. In some implementations, one or more modified high resolution arrays 214 can be substantially unchanged from the corresponding high resolution arrays 210. In some implementations, the texture coordinates 208 can be used to transfer procedurally generated ocean wave displacement to data points in an upsampled data array 210, wherein the data points represent volume near the water surface. In some implementations, the texture coordinates can also be combined with an original array (e.g. the volume array 204 or the velocity array 206). The displacement data can be applied to the implicit surface in various ways. For example, in one way, the y-component of the displacement vector is used to displace the implicit surface in the normal direction. In these cases, the y-component value is added to the scalar field defining the implicit surface or volume. In another example, the displacement can be treated as a velocity over a predetermined time step and levelset advection techniques can be applied to evolve the surface. In such cases, the displacement vector can be oriented such that the y-displacement aligns with the normal direction of the implicit surface. In addition, the procedural ocean data can also provide a velocity vector which can be added to the upsampled velocity data array.

The modified high resolution arrays 214 reflect both the high frequency and the low frequency spatial features of the simulated volume of liquid. Also, because the modified high resolution arrays 214 are generated as simulation data, a preview image can be generated without depending on rendering. The modified high resolution arrays 214 can be used for subsequent processing such as rendering 218 or additional simulations 216, including, for example, particle simulations.

Partitioned Computations in Particle Simulations

Particle simulation is a technique used for simulations such as simulating liquids and motions of liquids. A particle, as used in a liquid simulation context, can be considered to be a point in space that has an associated set of data. Particles can be used as units of simulated liquids and characteristics of the simulated volume of liquid can be computed based on characteristics computed for individual simulated particles or clusters of simulated particles. For example, a flow of a simulated volume of liquid can be computed based on computing fluid dynamics of the individual particles. As another example, for visualization or rendering purposes, surfaces based on multiple particles can be computed. In particle simulations, application of fluid dynamics equations can be discretized using moving particles and their interactions. Particle simulations can allow simulation and modeling of various fluids with different physical properties, and their interactions with other virtual objects.

In some implementations, a particle can be considered a spherically-shaped object (e.g. a droplet) seemingly constructed of a liquid (e.g., water). The simulated volume of liquid can be considered to be a collection of such particles, and a motion of the simulated volume of liquid can be computed based on the motion of one or more individual particles. To govern the motion of a particle, one or more techniques may be implemented. For example, fluid characteristics of a particle can be computed based on forces or velocities that affect the particle. For liquid simulations, the motion of a given particle is likely affected by the motion of a set of other particles in the vicinity, and therefore fluid dynamics computations are performed collectively one a group of particles.

Figure 3A:
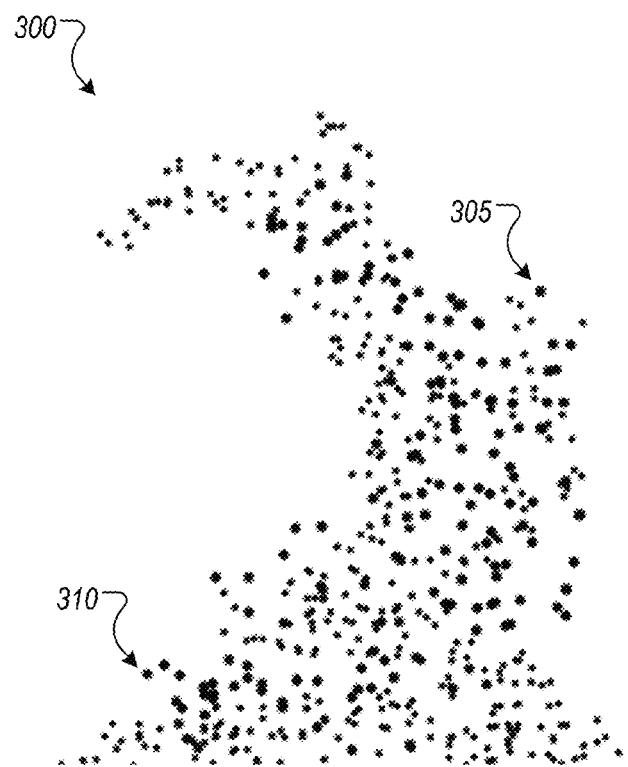
FIGS. 3A-3D illustrate partitioned computation of particle dynamics.
Figure 3B:
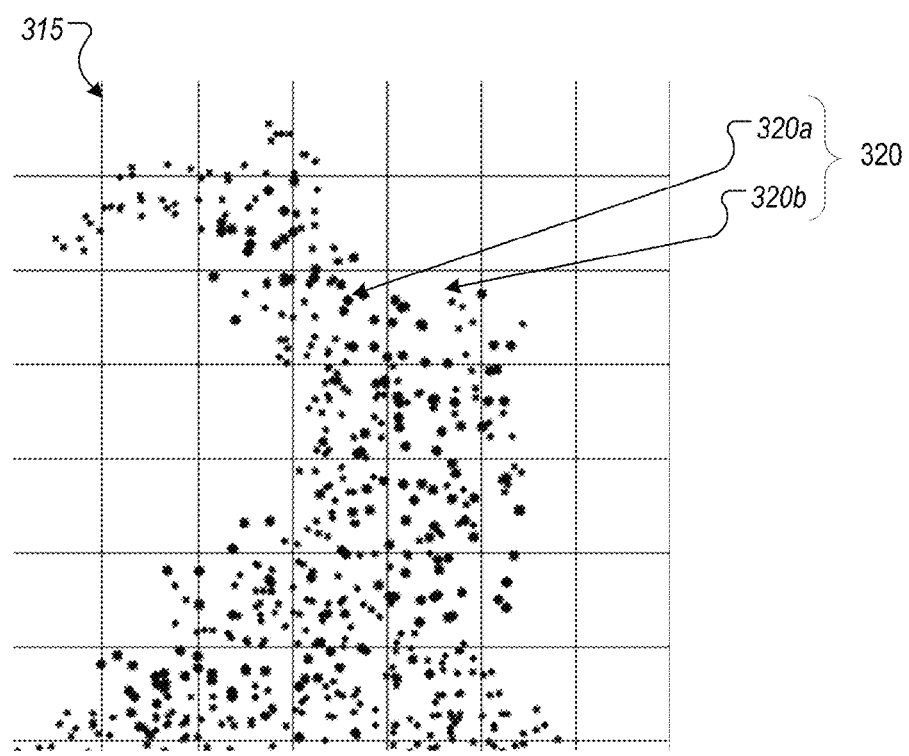

FIG. 3A shows an example of a set of particles 300 that is used in a particle simulation representing a splash. The collective motion of the splash can be computed, for example, by computing the motion of the particles included in the set 300. The motion of the particles can be calculated under the constraints of fluid dynamics using, for example, a fluid solver. The fluid solver can be any combination of software and hardware modules that compute the motion of a set of particles using computational fluid dynamics principles. In some implementations, the entire set 300 can be provided to the fluid solver to compute the motion or dynamics of the splash depicted in FIG. 3A. In such cases, the fluid solver can take into account the influence of each particle within the set 300 on the other particles within the set.

In some implementations, two adequately spatially separated particles can exert negligible influence on the motions of one another. For example, for the splash depicted in FIG. 3A, the motion of the particle 305 can have negligible effect on the motion of the particle 310. Therefore, computational and memory requirements can be significantly reduced by separating the set 300 into multiple groups and computing the dynamics within the groups independently of one another.

In some implementations, the set of particles 300 can be partitioned into multiple groups based on overlaying grid 315 over the spatial distribution of the set of particles 300. The grid can divide the spatial distribution of the set 300 into multiple blocks 320a, 320b etc. (320, in general). The area of the blocks can be user-defined based on the spacing of the grid lines along one or more dimensions. The blocks 320 can be substantially equal in size to one another. In some implementations a block 320 can be different in size from at least another block in the same grid 315. The blocks can be square, rectangular, polygonal, or of another user-defined shape.

The set 300 can be partitioned into the multiple groups based on their locations with respect to the blocks 320 as defined by the grid 315. For example, particles can be included in a first group if they are located within the block 320a. Similarly, particles can be included in a second group if they are located within the block 320b. In some implementations, a region of influence can be defined for each particle and the particles can be partitioned into the multiple groups based on their region of influence. For example, if a particle is distributed within the block 320b, but a region of influence of the particle at least partially overlaps with the block 320a, the particle can be included in the first group, and possibly in addition to being included in the second group. Allowing particles to be included into multiple groups facilitates simulation of some amount of coupling between particles from adjacent or nearby blocks. The region of influence for a particle can be defined as a circular or another geometrical shape around the particle. The extent of the region of influence can be user-defined thereby allowing a user to control a threshold distance from which a particle may influence the dynamics of other particles.

Figure 3C:
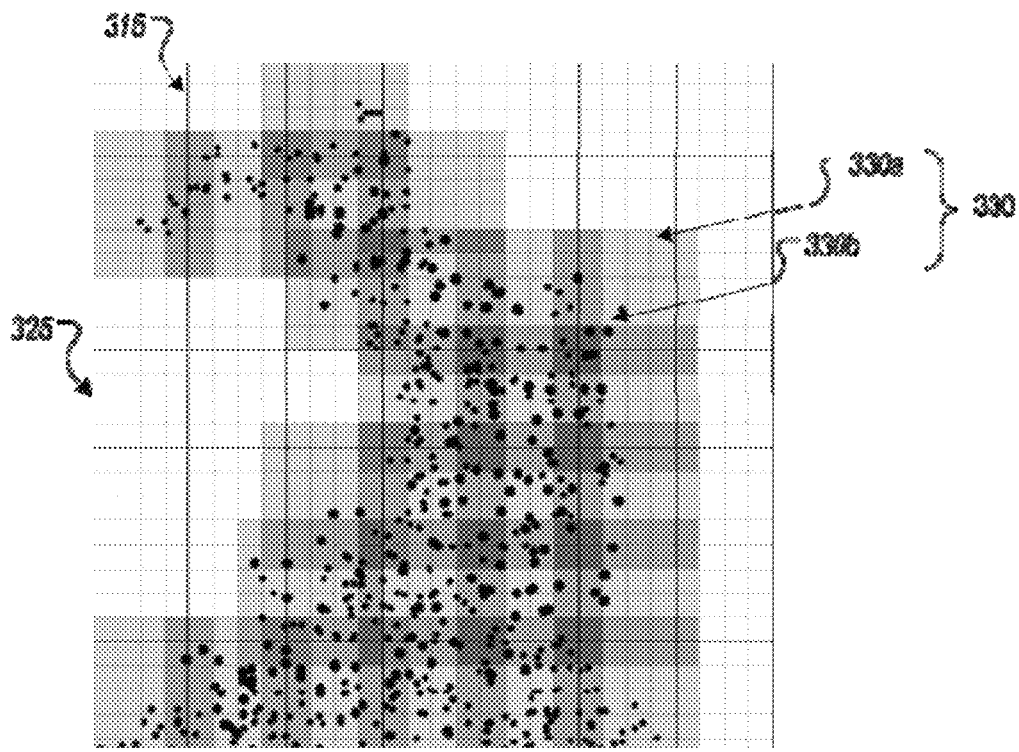
Figure 3D:
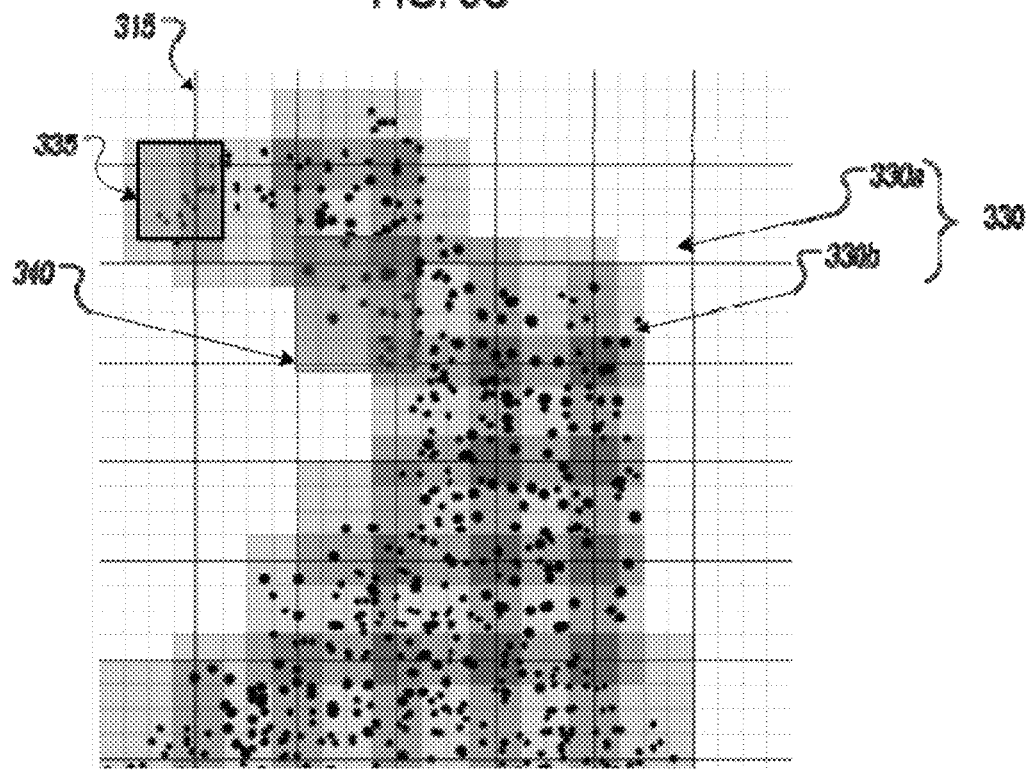

Referring to FIG. 3C, in some implementations, the grid 315 can be further subdivided into smaller cells 330a, 330b, etc. (330, in general) by overlaying a finer grid 325 over the spatial distribution of the set of particles 300. The finer grid 325 and the resulting cells 330 can also be used to define overlap between blocks 320. For example, FIG. 3C depicts that adjacent blocks overlap by one cell 330 on each side. In some implementations, the cells 330 can be used to further shrink the area over which the fluid solver operates. For example, the shaded area in the example shown in FIG. 3D depicts the region that is considered by the fluid solver. The shaded area can also be referred to as a region of interest. In this example, the cell 330a (and a number of other cells) is omitted from the region from the region of interest, but the cell 330b is included. Whether or not a cell 320 is included in the region of interest can depend on, for example, whether a particle exists within the area defined by the cell. Shrinking the region of interest can reduce the requirement of computing power and memory.

In some implementations, the fluid solver can compute the dynamics of multiple groups of particles in parallel. For example, as depicted in FIG. 3D, computations for the groups of particles included within the regions 335 and 340, respectively, can be performed independently and in parallel. In some implementations, the number of groups that are processed in parallel can depend on available computing resources. For example, if N processors are available (N being an integer greater than zero), N groups of particles can be processed together.

Figure 4D:
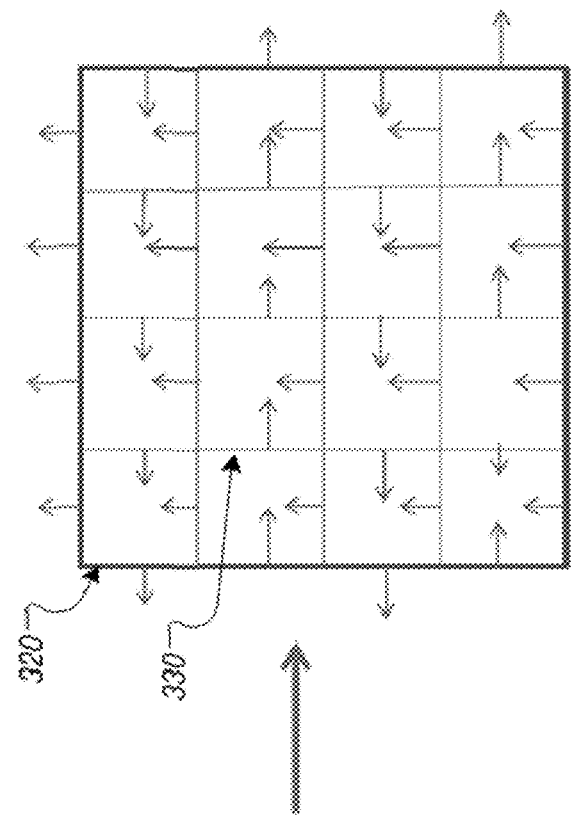
Figure 4C:
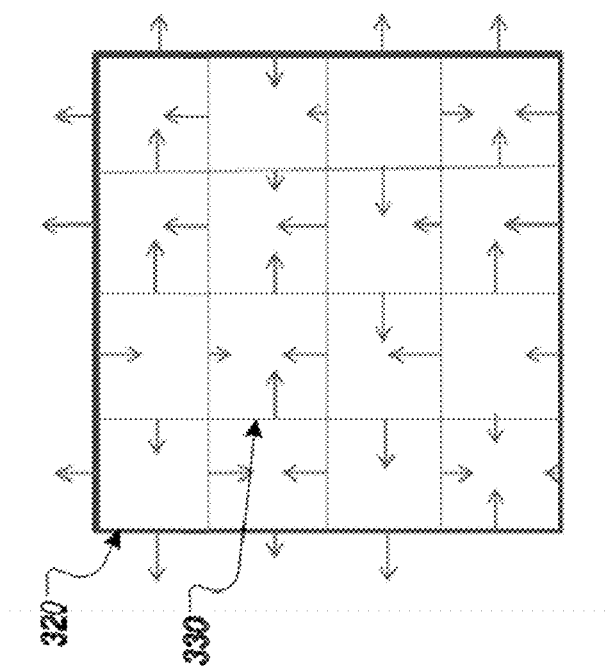
Figure 4F:
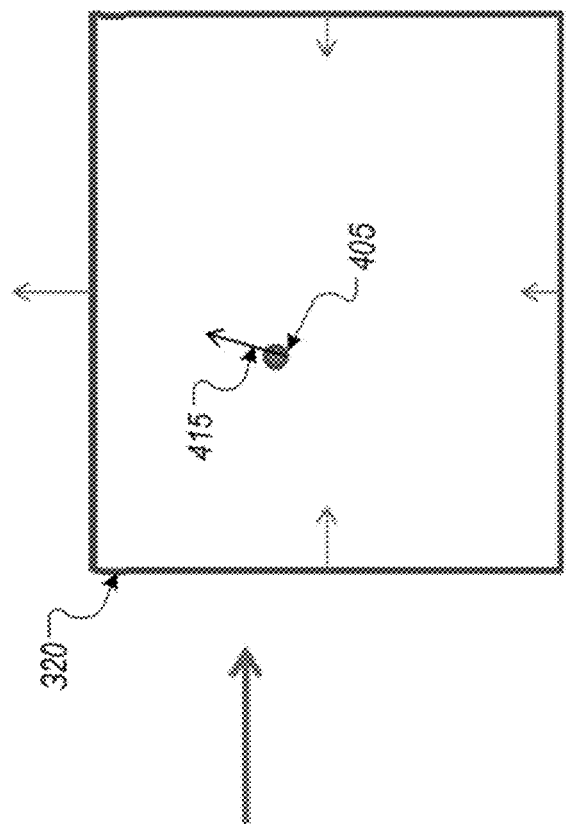
Figure 4E:
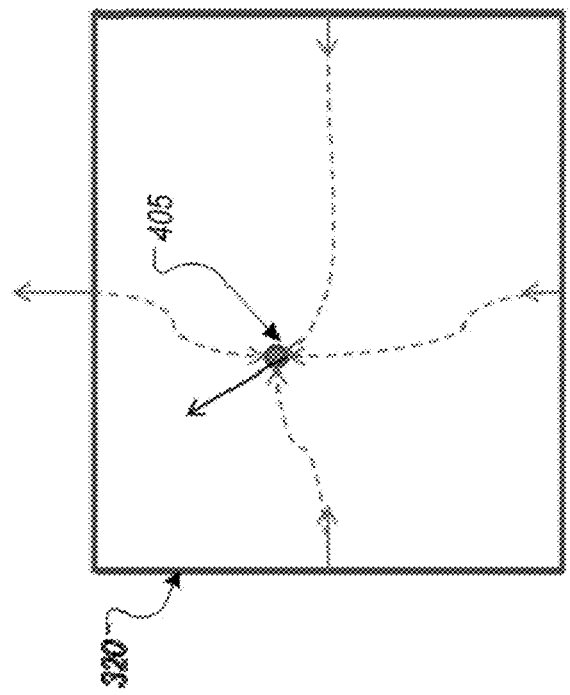

FIGS. 4A-4F depict an example of computing dynamics of particles within a cell 330. This is shown for illustrative purposes, and other methods and techniques for performing computations on particles included within a cell are possible. FIG. 4A shows a cell 330 that includes a number of particles (e.g. a particle 405) along with their corresponding velocity vectors (e.g. the velocity vector 410). In some implementations, particle velocities can be transferred to the face centers of the cell 330, as depicted in FIG. 4B. The example shown in FIG. 4C depicts multiple cells 330 within a block 320, wherein for each cell 330, the particle velocities are sampled onto the corresponding faces. As depicted in FIG. 4D, the velocities on each cell 330 can then be made incompressible using fluid simulation techniques The differences between divergent and incompressible grid velocities can then be computed and subsequently sampled back on the individual particles of the block. This is depicted in FIG. 4E, where the velocity difference is transferred from the block 320 on to one of the particles 405. FIG. 4F depicts the final result that shows a corrected velocity 415 of the particle 405. When transferring particle velocities to the face centers of a cell, only the velocity component normal to the face is preserved. A kernel centered at each particle can be used to transfer the velocities to accumulate the velocity components at each face. In addition, the kernel weights from each particle can be accumulated and the result can be used to normalize the accumulated velocity components. For a given cell, directional faces such as x-faces, y-faces and z-faces can be defined as faces whose normals point in the x-direction, y-direction and z-direction, respectively. Each directional face can store a weighted average of the corresponding directional velocities of nearby particles. By transferring velocities to directional faces, a grid-based technique can be used to build a sparse linear system whose solution results in incompressible velocities. FIGS. 4A-4F depict an example of this process.

Figure 5A:
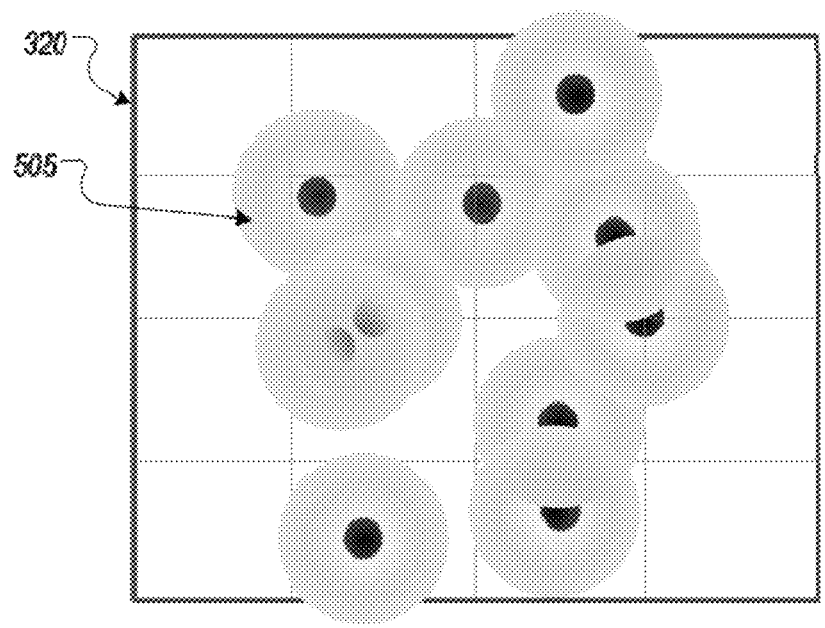
FIGS. 5A-5D illustrate an example of computing a simulated surface from a group of simulated particles.
Figure 5B:
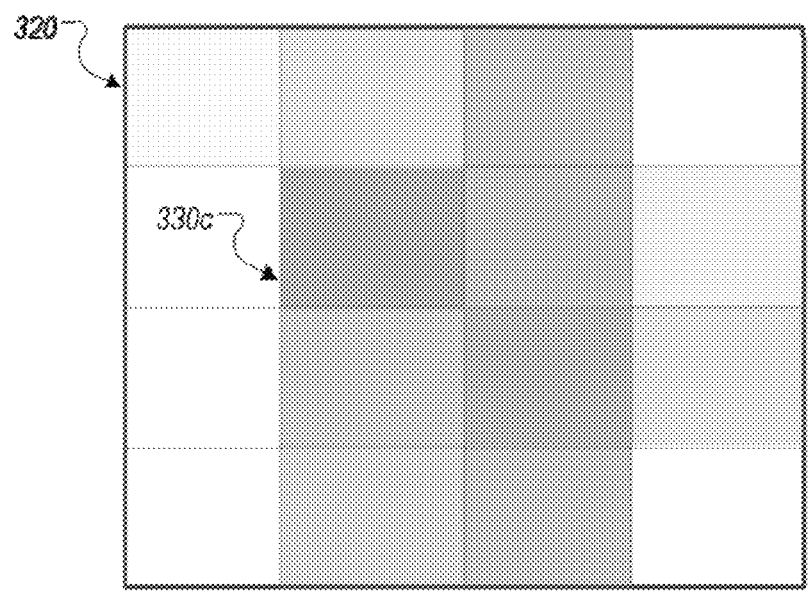
Figure 5C:
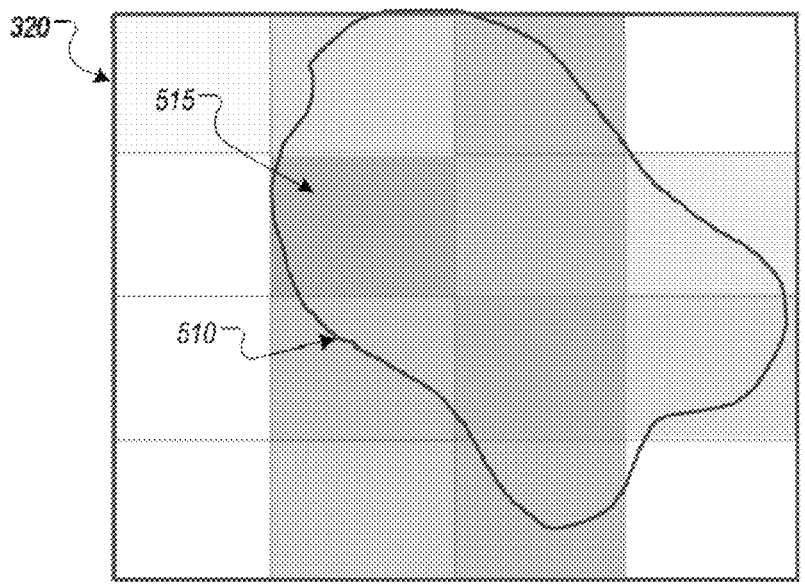

Various other types of computations can be performed on the partitioned particles described above. For example, FIGS. 5A-5D illustrate an example of computing a simulated surface from a group of simulated particles within a block 320. The example depicted in FIG. 5A-5D show a kernel based surface generation technique. Alternatively, other surface generation techniques can also be used to generate a surface from particles included within a block 320. FIG. 5A shows a spherical kernel 505 for each of the particles within the block 320. In some implementations the kernel 505 can be circular, cubical, or of another two-dimensional or three-dimensional shape. The spherical kernel 505 can be used to sample particle density onto the cells 330 within the grid 315. In some implementations, higher the number of particles included within (or proximate to) a particular cell, higher the particle density for that particular cell. For example, referring to FIG. 5B, the particle density of the cell 330c is the highest because of being influenced by kernels of four different particles. This is represented by a dark shade for the cell 330c. In the example of FIG. 5B, a darker shade indicates a higher particle density. Referring to FIG. 5C, a density contour 510 can be specified to extract an isosurface 515 based on the cell densities.

The isosurface 515 can be an implicit surface in three dimensions that is defined by specifying a contour of a scalar density field. Various techniques can be used for creating scalar density fields from a particle distribution. For example, in a technique often referred to as isotropic constructive solid geometry union, each particle can be considered to have a spherical implicit surface of a user-specified radius with the center at the particle location. The scalar field centered at each particle can be such that a zero-contour lies at exactly the particle radius. For a sample in the background grid, the scalar field value can be computed based on the particles within a given proximity of the sample. For example, the scalar field value for each particle near the sample can be computed and the minimum can be selected as the final value. In another technique, often referred to as isotropic-add, a weighted spherical kernel centered at each particle, can be used. The spherical kernel can have a user-defined radius. In this technique, the scalar field can be a density field centered at each particle with the highest concentration being at the particle center and reducing to a lower value (or zero) at the particle radius. The change in density between the particle center and the particle radius can be linear or non-linear (e.g. quadratic or quartic). The resultant scalar field value on the background grid can be computed by adding density fields of nearby particles that contribute nontrivial density values at the sample location. In some implementations, the isosurface 515 can be reconstructed using a surface reconstruction technique that is based on distance fields of isolated particles, as described in the publication "*Animating Sand as a Fluid*" by Zhu and Bridson, ACM SIGGRAPH, 2005, the entire content of which is incorporated herein by reference. The isosurface 515 can also be reconstructed using other surface reconstruction techniques such as the "dual marching cubes" technique described in the publication: "*Dual Marching Cubes*" by Gregory M Nielson, 15th IEEE Visualization 2004 Conference, the entire content of which is also incorporated herein by reference.

Figure 5D:
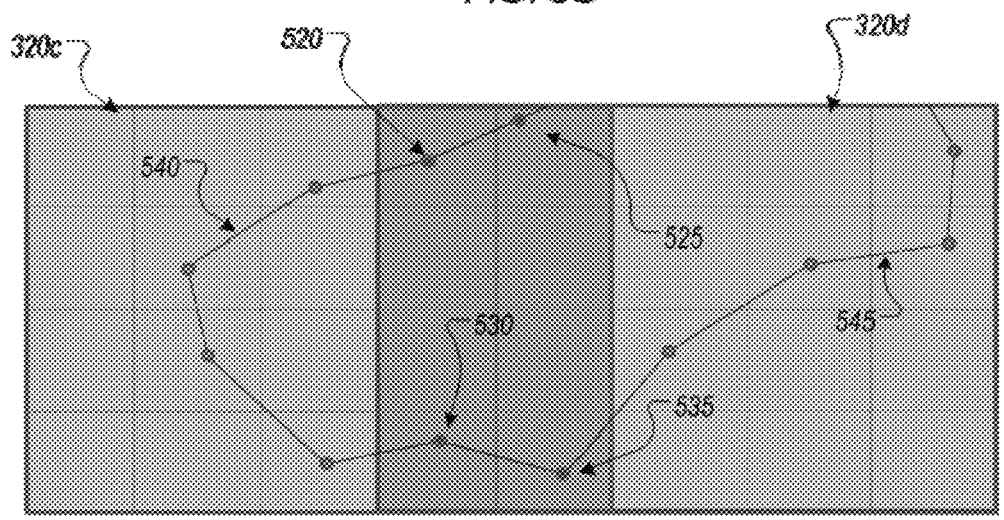

Because the computations within a given block is independent of the computations in the other blocks, a different isosurface can be computed for each block. In some cases, where two adjacent blocks are partially overlapping, a portion of the surface can be computed twice, once for each block. This situation is illustrated in FIG. 5D where each of the vertices 520, 525, 530 and 535 are computed twice, once during computing the density contour 540 (for block 320c) and again during computing the density contour 545 (for block 320d). In such cases, a duplicate vertex is discarded for each instance in combining the computed isosurfaces to produce the final explicit surface.

In some implementations, other parameters can also be used in computing the cell densities. For example, a distance between two particles can be considered to determine whether they should be considered for computing a same surface. In such cases, a threshold condition can control whether one or more surfaces should be formed from a given group of particles. If the threshold condition allows only relatively closely spaced particles to be included on a common surface, several surfaces may be formed from a group of particles. Alternatively, if the threshold condition allows for far apart particles to be included on a common surface, a large surface may be computed from the same group of particles.

Selecting Particles for Inclusion in Particle Simulations

In computer graphics, it is often of interest to simulate interactions between a simulated volume of liquid and a virtual object. For example, when a virtual object hits a water surface from above, or a virtual creature jumps out from within a volume of water, or the water surface is breached in some other way, the surface of the simulated volume of water is disturbed and effects such as splashes are created. In some implementations, the interactions between a simulated volume of liquid and one or more virtual objects can be captured via particle simulations.

Figure 6A:
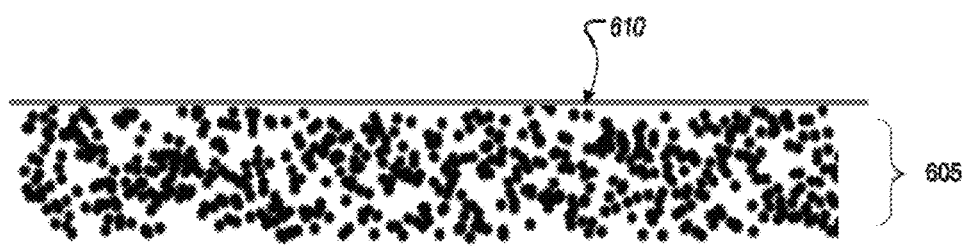
FIGS. 6A and 6B illustrate an example of selecting a group of particles within a particle simulation.
Figure 6B:
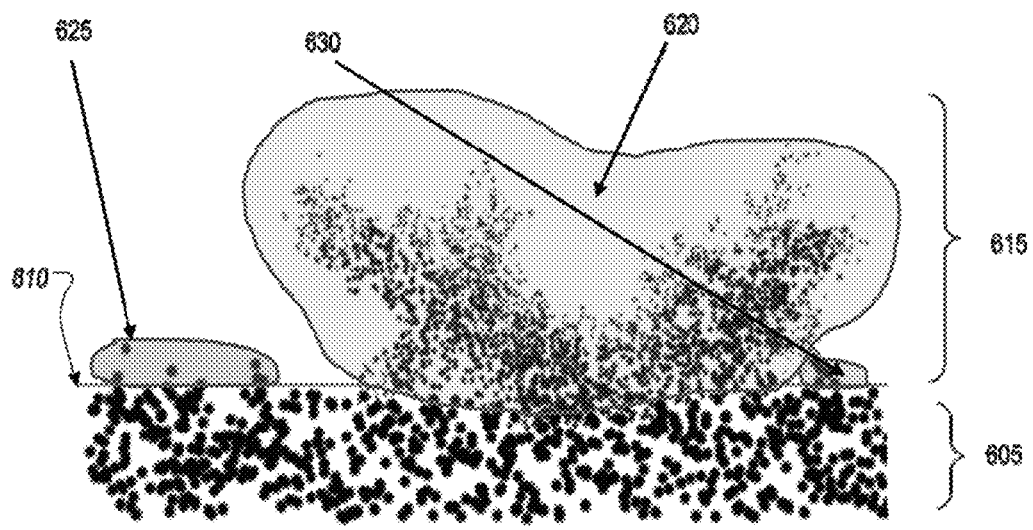

Referring to FIG. 6A, multiple simulated particles 605 can be positioned or seeded below a surface 610 of the simulated volume of liquid, in preparation of computing an interaction of the simulated volume of liquid with a virtual object. The surface 610 can be substantially similar to a high resolution implicit surface as described above. When the surface is breached by a virtual object, the simulated particles 605 can be made to interact with the virtual object under the constraints of fluid dynamics. This simulates effects that occur in the real world under similar conditions. For example, when the surface 610 is breached by a virtual object, a subset of the particles 605 can be sent outward relative to the surface 610 to create an effect that reflects a splash. This is illustrated using an example in FIG. 6B, where a subset 615 of the particles 605 are sent upward relative to the surface 610 as splash particles. In some implementations, the subset 615 of particles can capture high frequency details beyond what is possible using the surface 610, due, for example, a limited grid resolution used in simulating the surface 610.

In some implementations, not all particles included in the subset 615 are of interest in computing a realistic representation of a splash. For example, some groups of particles 625, 630 can be end up above the surface, even when they are not actually a part of the splash. This can happen, for example, due to interactions between the particles 605 that remain below the surface 610. In some implementations, it can be desirable to filter out the groups of particles 625 or 630 from subsequent computations because they do not contribute to a realistic representation of the splash being simulated. Therefore, in some implementations, a group of interest 620 can be identified from the particles 615 that escape the surface 610. The group of interest 620 can represent, for example, true splash particles that contribute to simulating a realistic representation of the splash.

In some implementations, whether a particular particle from the subset 615 can be included in a group of interest 620, is determined based on determining if the particle satisfies one or more threshold conditions. The threshold conditions can be based on dynamics of the particular particle after the particle escapes the surface 610. For example, a particle can be included in the group of interest based on determining if the particle travels a threshold distance relative to the surface 610. Therefore, unless the particle reaches a minimum distance above the surface 610 after escaping the surface, the particle may not be included in the group of interest 620. In another example, a particle can be included in the group of interest 620 based on determining that a time period for which the particle remains above the surface 610 exceeds a threshold duration. This can help eliminate particles that are fleetingly ejected from the surface 610 for a short duration. In some implementations, a combination of the above threshold conditions (with the combination possibly including other threshold conditions) can be used in determining whether a particle can be included in the group of interest 620. For example, a particle can be included in the group of interest 620 if the particle is determined to have reached the stipulated minimum distance above the surface 610, and stayed above the surface for a duration that exceeds the threshold duration.

Whether or not a particle satisfies a threshold condition can be determined in various ways. In some implementations, the path of a given particle can be tracked during simulations to compute a position and/or time duration relative to the surface 610. For example, based on tracked simulation data, an age (i.e. a time duration) of a particle above the surface 610 can be computed as a difference between a current time and the time the particle first escaped the surface 610. The difference is sometimes referred to as a back-timed age of the particle. Computing the difference can require keeping track of time points associated with various spatial points along a path of a simulated particle. In some implementations, simulation data associated with the path of a particle can be used to determine whether the particle satisfies a threshold condition. For example, horizontal and vertical coordinates can be determined from a tracked path of the particle, and the particle can be included in the group of interest 620 if a relative vertical distance from the surface 610 (calculated based on the coordinates) exceeds the stipulated minimum distance.

Particles included in the group of interest 620 can be used for performing additional computations. For example, surface reconstructions or other secondary simulations can be performed based on particles included in the group of interest, without considering particles included in the groups 625 or 630. This way, undesirable particles that do not contribute to realistic simulations can be discarded, while lowering the computational burden.

Implementations Using Computing Devices

The following section describes a few examples as to how the operations and concepts described above can be implemented using a computing device. The computing device can be substantially similar to one of the devices described below with reference to FIG. 11.

Figure 7:
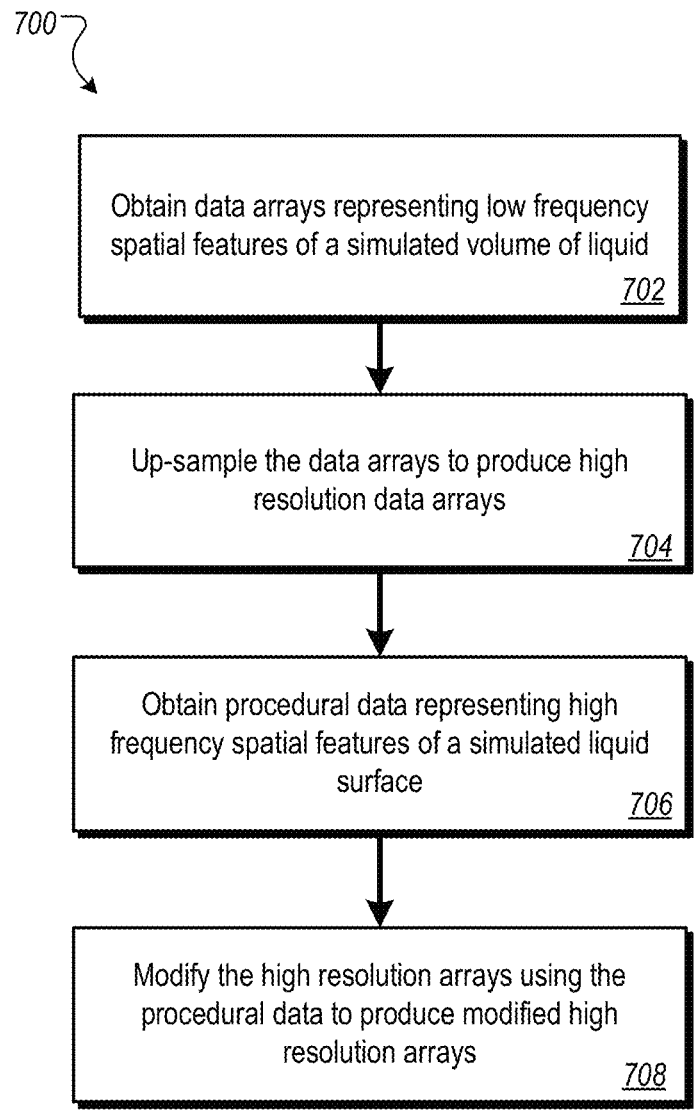
FIG. 7 is a flow chart depicting an example of operations for generating high resolution simulation data.

Referring to FIG. 7, a flowchart 700 represents operations of a computing device to generate high resolution simulation data. Such operations are typically executed by components (e.g., one or more processors) included in a computing device, however, operations may be executed by multiple computing devices. Along with being executed at a single site, execution of the operations may be distributed among two or more locations.

Operations of the computing device may include obtaining data arrays representing low frequency spatial features of a simulated volume of liquid (702). The data arrays can be obtained, for example, using the liquid simulation 202 as described above with reference to FIG. 2. The data arrays can have of one, two, three, or more dimensions, and can include scalar or vector valued data points. One or more data arrays representing the low frequency spatial features can be obtained. In some implementations, the obtained data arrays can also include features that might be considered to be high frequency features. Operations can also include up-sampling the obtained data arrays to produce high resolution data arrays (704). The up-sampling can be performed using interpolation techniques and can be followed by digitally filtering the one or more high resolution arrays. Operations further include obtaining procedural data that represents high frequency components of a simulated liquid surface (706). The procedural data can be obtained through computations based on, for example, user inputs or changing simulation conditions. Operations also include modifying the high resolution arrays using the procedural data to produce modified high resolution arrays (708). The modified high resolution arrays can be provided by analytically combining the high resolution data arrays with the procedurally generated data. Texture coordinates associated with the simulated volume of liquid can provide a look-up that allows for mapping the procedural data on to the high resolution arrays. The modified high resolution arrays can be used for rendering purposes, or to generate a preview image prior to rendering. The modified high resolution arrays can also be used for additional simulations. For example, the high resolution arrays can include enough details on the low frequency as well as high frequency spatial features of the simulated volume of liquid to allow for particle simulations producing realistic representations of high frequency effects such as spray or foam on a liquid surface.

Figure 8:
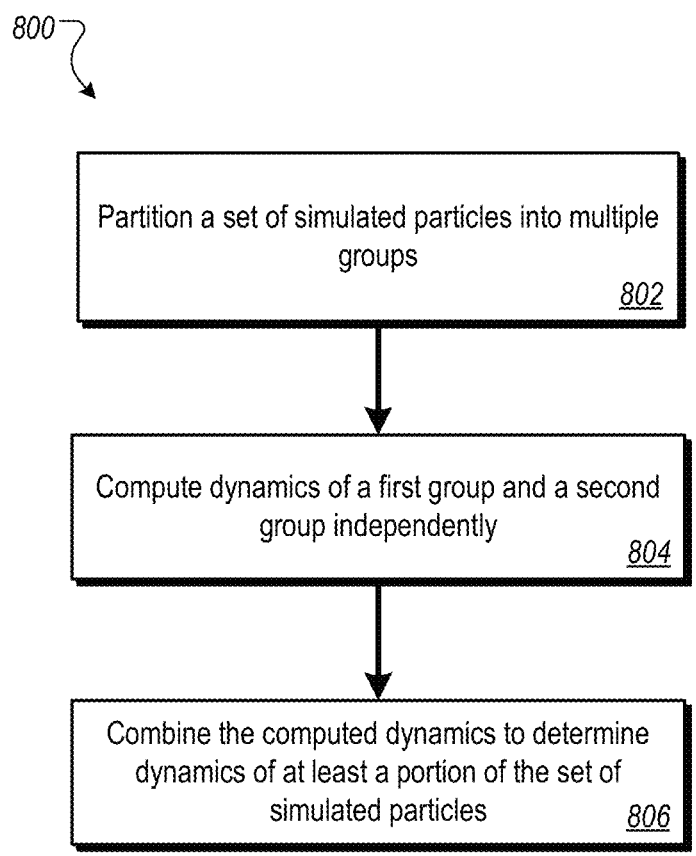
FIGS. 8 and 9 are flow charts depicting examples of operations for partitioned computations in particle simulations.

Referring to FIG. 8, a flowchart 800 represents operations of a computing device performing partitioned computations in particle simulations. Such operations are typically executed by components (e.g., one or more processors) included in a computing device, however, operations may be executed by multiple computing devices. Along with being executed at a single site, execution of the operations may be distributed among two or more locations.

Operations of the computing device may include partitioning a set of simulated particles into multiple groups (802). The set of particles can represent an extent of spatial distribution of a simulated liquid. The set can be divided into the multiple groups based on overlaying a virtual grid on the spatial distribution of the simulated liquid. The membership of the multiple groups can be determined based on locations of the particles with respect to the overlaid virtual grid. A range of influence can be defined for a particular particle and the particle can be included in a group based on the spatial extent of the range of influence. A particular particle can be included in one or more groups based on the spatial extent of the range of influence. The spatial range of one particle can differ from the spatial range of another particle. Operations also include computing dynamics of first group and a second group independently from one another (804). The dynamics of the first group can be computed in parallel to the dynamics of the second group. The number of groups for which the dynamics are computed in parallel can depend on, for example, available computing resources such as the number of processors, or the number of cores in a given multi-core processor. The dynamics within a given group can be computed based on computational fluid dynamics principles. Operations also include combining the computed dynamics to determine the dynamics associated with at least a portion of the simulated particles (806). The dynamics of the entire set of simulated particles can be computed by combining the partitioned computations from all the groups that the set is partitioned into.

Figure 9:
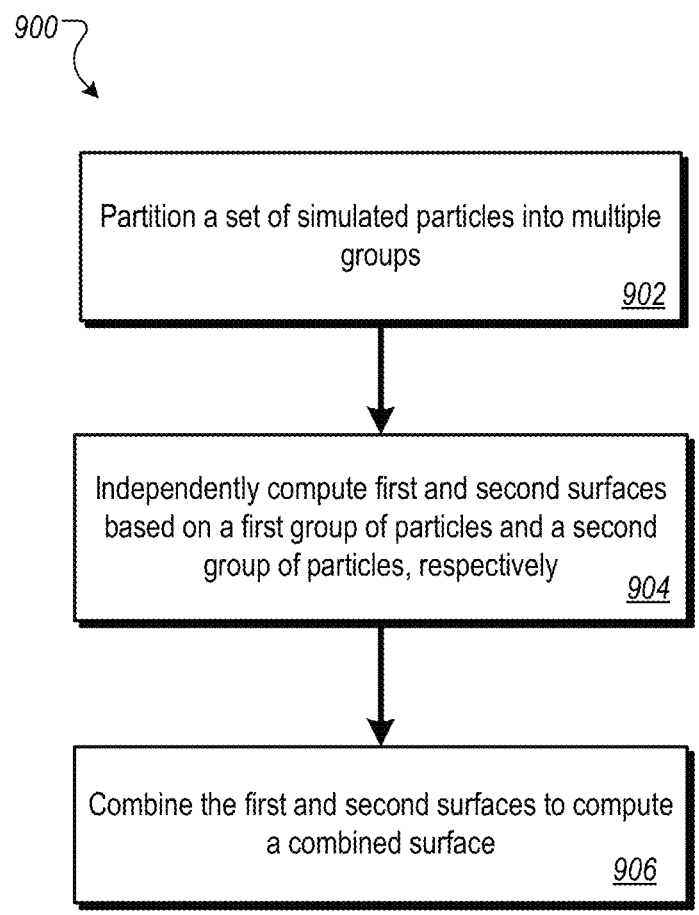

Referring to FIG. 9, a flowchart 900 represents operations of a computing device performing partitioned computations in particle simulations. Such operations are typically executed by components (e.g., one or more processors) included in a computing device, however, operations may be executed by multiple computing devices. Along with being executed at a single site, execution of the operations may be distributed among two or more locations.

Operations of the computing device may include partitioning a set of simulated particles into multiple groups (902). The partitioning can be done substantially similarly to as described above with respect to FIG. 8. Operations also include independently computing first and second surfaces based on a first group of particles and a second group of particles, respectively (904). In other words, a first surface can be computed from a first group of simulated particles and a second surface can be computed from a second group of simulated particles. The first and second groups are included in the multiple groups that the particles are partitioned into. The surface computation using the particles of the first group can be computed in parallel to the surface computation of the particles of the second group. The number of groups for which the computations can be done in parallel can depend on, for example, available computing resources such as the number of processors, or the number of cores in a given multi-core processor. Operations further include combining the first and second surfaces to compute a combined surface (906). In some cases, where a spatial extent of the first group partially overlaps the spatial extent of the second group, some portions of the first and second surfaces may overlap when combining the surfaces. In such cases, some points from the overlapping portions can be discarded during computing the combined surface.

Figure 10:
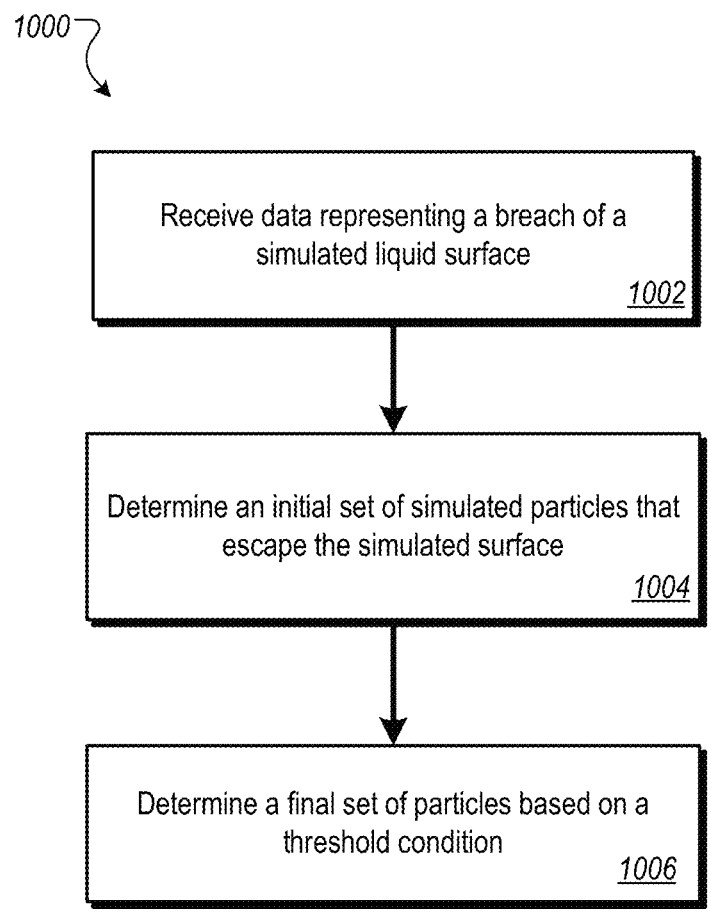
FIG. 10 is a flow chart depicting an example of operations for selecting a group of particles within a particle simulation.

Referring to FIG. 10, a flowchart 1000 represents operations of a computing device for selecting particles within a particle simulation. Such operations are typically executed by components (e.g., one or more processors) included in a computing device, however, operations may be executed by multiple computing devices. Along with being executed at a single site, execution of the operations may be distributed among two or more locations.

Operations of the computing device may include receiving data representing a breach of a simulated liquid surface (1002). The data representing the breach can indicate, for example, that a virtual object hits the surface from either side of the surface. A set of simulated particles can escape the simulated liquid surface as a result of the breach. Operations can include determining an initial set of simulated particles that escape the simulated surface due to the breach (1004). For example, the initial set can include all particles that move upward from a water surface when a virtual object crashes on the water surface. In some cases, not all the particles in the initial set contribute to a realistic representation of a similar situation in the real world. Therefore, operations also include determining a final set of particles based on a threshold condition (1006). For example, the final set of particles (which can also be referred to as a set of interest) can be determined such that a particle included in the final set satisfies the threshold condition. The threshold condition can be related to the dynamics of the particle after escaping the liquid surface. The threshold condition can include, for example, any combination of: a threshold distance traveled relative to the liquid surface, and a threshold duration of time spent above the liquid surface. Determining the threshold conditions for a particle can include tracking the dynamics of the particle after the particle escapes the liquid surface. To determine a time spent by the particle above the liquid surface, a difference between a current time and the time the particle first escaped the surface, can be determined. The final set of particles can be used for subsequent simulations or rendering.

Figure 11:
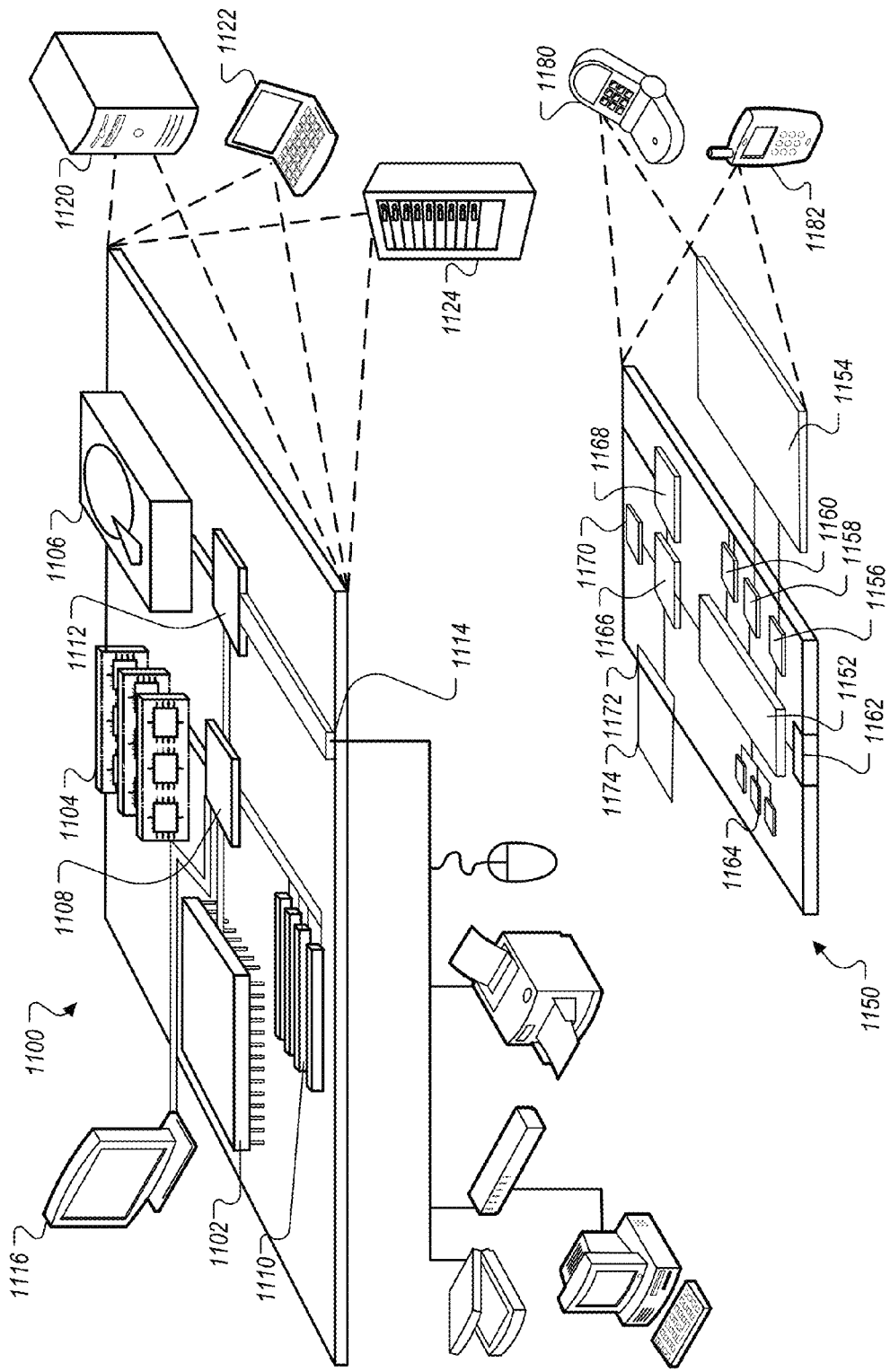
FIG. 11 is a block diagram of computing devices and systems.

FIG. 11 is a block diagram of computing devices that may be used and implemented to perform operations associated with producing objects seemingly constructed of fluid-like substances. Computing device 1100 can also represent various forms of digital computers, such as laptops, desktops, workstations, personal digital assistants, servers, blade servers, mainframes, and other appropriate computers.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and can be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses can be used, as appropriate, along with multiple memories and types of memory. Also, multiple computing devices 1100 can be connected, with each device providing portions of the necessary operations (e.g., as a server bank, a group of blade servers, or a multi-processor system).

The memory 1104 stores information within the computing device 1100. In one implementation, the memory 1104 is a computer-readable medium. In one implementation, the memory 1104 is a volatile memory unit or units. In another implementation, the memory 1104 is a non-volatile memory unit or units.

The storage device 1106 is capable of providing mass storage for the computing device 1100. In one implementation, the storage device 1106 is a computer-readable medium. In various different implementations, the storage device 1106 can be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1104, the storage device 1106, memory on processor 1102, or the like.

The high speed controller 1108 manages bandwidth-intensive operations for the computing device 1100, while the low speed controller 1112 manages lower bandwidth-intensive operations. Such allocation of duties is exemplary only. In one implementation, the high-speed controller 1108 is coupled to memory 1104, display 1116 (e.g., through a graphics processor or accelerator), and to high-speed expansion ports 1110, which can accept various expansion cards (not shown). In the implementation, low-speed controller 1112 is coupled to storage device 1106 and low-speed expansion port 1114. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1100 can be implemented in a number of different forms, as shown in the figure. For example, it can be implemented as a standard server 1120, or multiple times in a group of such servers. It can also be implemented as part of a rack server system 1124. In addition, it can be implemented in a personal computer such as a laptop computer 1122. Alternatively, components from computing device 1100 can be combined with other components in a mobile device (not shown).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:

simulating a volume of liquid at a resolution to produce low frequency spatial features of the volume of liquid, wherein the simulation produces one or more data arrays;

up-sampling the one or more data arrays to produce corresponding high resolution data arrays, wherein a resolution of the one or more data arrays is lower than a resolution of the one or more high resolution data arrays, and wherein the resolution of the one or more high resolution data arrays is based on a level of resolution defined for an application;

obtaining procedural data representing high frequency spatial features of a liquid surface of the volume of liquid, wherein the procedural data is obtained using one or more computations on one or more inputs associated with the liquid surface, and wherein a resolution of the procedural data is based on the level of resolution defined for the application; and modifying the one or more high resolution data arrays using the procedural data to produce corresponding modified data arrays that reflect both the high frequency and the low frequency spatial features of the simulated volume of liquid, wherein the one or more high resolution data arrays are modified by:

mapping a first data point of the procedural data to a second data point of the one or more high resolution arrays; and modifying the second data point based on the first data point, wherein modifying the second data point includes combining the first data point with the second data point.

2. The method of claim 1, further comprising:
rendering at least one image frame using the one or more modified data arrays.

3. The method of claim 1, further comprising:
performing a simulation using the one or more modified data arrays.

4. The method of claim 3, wherein the simulation includes particle simulation.

5. The method of claim 1, further comprising:
producing a preview image based on the one or more modified data arrays.

6. The method of claim 5, wherein the preview image is produced before producing a corresponding rendered image.

7. The method of claim 1, wherein mapping the first data point to the second data point is based on texture coordinate data related to the simulated volume of liquid.

8. The method of claim 1, wherein the one or more data arrays representing the low frequency spatial features include a data array representing an implicit surface of the simulated volume of liquid.

9. The method of claim 1, wherein the one or more data arrays representing the low frequency spatial features include a data array representing velocities at a plurality of points within the simulated volume of liquid.

10. The method of claim 1, wherein the procedural data is synthesized based on a user input.

11. The method of claim 1, wherein the one or more data arrays are three dimensional.

12. The method of claim 1, wherein the procedural data includes a set of vectors that represents simulated waves on the simulated liquid surface.

13. The method of claim 12, wherein each vector in the set of vectors includes an in-plane displacement component and a height-field component.

14. A system comprising:
a computing device comprising:
a memory configured to store instructions; and
a processor configured to execute the instructions to perform a method comprising:
simulating a volume of liquid at a resolution to produce low frequency spatial features of the volume of liquid, wherein the simulation produces one or more data arrays;
up-sampling the one or more data arrays to produce corresponding high resolution data arrays, wherein a resolution of the one or more data arrays is lower than a resolution of the one or more high resolution data arrays, and wherein the resolution of the one or more high resolution data arrays is based on a level of resolution defined for an application;
obtaining procedural data representing high frequency spatial features of a liquid surface of the volume of liquid, wherein the procedural data is obtained using one or more computations on one or more inputs associated with the liquid surface, and wherein a resolution of the procedural data is based on the level of resolution defined for the application; and
modifying the one or more high resolution data arrays using the procedural data to produce corresponding modified data arrays that reflect both the high frequency and the low frequency spatial features of the simulated volume of liquid, wherein the one or more high resolution data arrays are modified by:
mapping a first data point of the procedural data to a second data point of the one or more high resolution arrays; and
modifying the second data point based on the first data point, wherein modifying the second data point includes combining the first data point with the second data point.

15. The system of claim 14, wherein at least one image frame is rendered using the one or more modified data arrays.

16. The system of claim 14, wherein a simulation is performed using the one or more modified data arrays.

17. The system of claim 16, wherein the simulation includes particle simulation.

18. The system of claim 14, wherein a preview image is produced based on the one or more modified data arrays.

19. The system of claim 18, wherein the preview image is produced before producing a corresponding rendered image.

20. The system of claim 14, wherein mapping the first data point to the second data point is based on texture coordinate data related to the simulated volume of liquid.

21. The system of claim 14, wherein the one or more data arrays representing the low frequency spatial features include a data array representing an implicit surface of the simulated volume of liquid.

22. The system of claim 14, wherein the one or more data arrays representing the low frequency spatial features include a data array representing velocities at a plurality of points within the simulated volume of liquid.

23. The system of claim 14, wherein the procedural data is synthesized based on a user input.

24. The system of claim 14, wherein the one or more data arrays are three dimensional.

25. The system of claim 14, wherein the procedural data includes a set of vectors that represents simulated waves on the simulated liquid surface.

26. The system of claim 25, wherein each vector in the set of vectors includes an in-plane displacement component and a height-field component.

27. A computer program product tangibly embodied in a computer readable storage device and comprising instructions that when executed by a processor perform a method comprising:
simulating a volume of liquid at a resolution to produce low frequency spatial features of the volume of liquid, wherein the simulation produces one or more data arrays;
up-sampling the one or more data arrays to produce corresponding high resolution data arrays, wherein a resolution of the one or more data arrays is lower than a resolution of the one or more high resolution data arrays, and wherein the resolution of the one or more high resolution data arrays is based on a level of resolution defined for an application;
obtaining procedural data representing high frequency spatial features of a liquid surface of the volume of liquid, wherein the procedural data is obtained using one or more computations on one or more inputs associated with the liquid surface, and wherein a resolution of the procedural data is based on the level of resolution defined for the application; and
modifying the one or more high resolution data arrays using the procedural data to produce corresponding modified data arrays that reflect both the high frequency and the low frequency spatial features of the simulated volume of liquid, wherein the one or more high resolution data arrays are modified by:
mapping a first data point of the procedural data to a second data point of the one or more high resolution arrays; and modifying the second data point based on the first data point, wherein modifying the second data point includes combining the first data point with the second data point.

28. The computer program product of claim 27 further comprising instructions for:

rendering at least one image frame using the one or more modified data arrays.

29. The computer program product of claim 27 further comprising instructions for:

performing a simulation using the one or more modified data arrays.

30. The computer program product of claim 29, wherein the simulation includes particle simulation.

31. The computer program product of claim 27 further comprising instructions for:

producing a preview image based on the one or more modified data arrays.

32. The computer program product of claim 31, wherein the preview image is produced before producing a corresponding rendered image.

33. The computer program product of claim 27, wherein mapping the first data point to the second data point is based on texture coordinate data related to the simulated volume of liquid.

34. The computer program product of claim 27, wherein the one or more data arrays representing the low frequency spatial features include a data array representing an implicit surface of the simulated volume of liquid.

35. The computer program product of claim 27, wherein the one or more data arrays representing the low frequency spatial features include a data array representing velocities at a plurality of points within the simulated volume of liquid.

36. The computer program product of claim 27, wherein the procedural data is synthesized based on a user input.

37. The computer program product of claim 27, wherein the one or more data arrays are three dimensional.

38. The computer program product of claim 27, wherein the procedural data includes a set of vectors that represents simulated waves on the simulated liquid surface.

39. The computer program product of claim 38, wherein each vector in the set of vectors includes an in-plane displacement component and a height-field component.

* * * * *